US012568063B2

(12) United States Patent
Li et al.

(10) Patent No.: US 12,568,063 B2
(45) Date of Patent: Mar. 3, 2026

(54) PACKET PROCESSING METHOD, APPARATUS, AND SYSTEM, AND COMPUTER-READABLE STORAGE MEDIUM

(71) Applicant: HUAWEI TECHNOLOGIES CO., LTD., Guangdong (CN)

(72) Inventors: Juan Li, Beijing (CN); Zhouyi Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 18/405,685

(22) Filed: Jan. 5, 2024

(65) Prior Publication Data

US 2024/0171652 A1     May 23, 2024

Related U.S. Application Data

(63) Continuation of application No. PCT/CN2022/101308, filed on Jun. 24, 2022.

(30) Foreign Application Priority Data

Jul. 8, 2021     (CN) .......................... 202110772864.5
Aug. 31, 2021     (CN) .......................... 202111016498.7

(51) Int. Cl.
*H04L 61/5053* (2022.01)
*H04L 41/18* (2022.01)

(52) U.S. Cl.
CPC .......... *H04L 61/5053* (2022.05); *H04L 41/18* (2013.01)

(58) Field of Classification Search
CPC ... H04L 41/044; H04L 41/08; H04L 41/0803; H04L 41/0894; H04L 41/18; H04L 61/5053
See application file for complete search history.

(56) References Cited

U.S. PATENT DOCUMENTS

2021/0112007 A1* 4/2021 Huang ................... H04L 67/56
2022/0030438 A1* 1/2022 Song ..................... H04W 24/04

FOREIGN PATENT DOCUMENTS

| CN | 107645556 B | 12/2018 |
| CN | 111865621 A | 10/2020 |
| WO | 2018082035 A1 | 5/2018 |

OTHER PUBLICATIONS

English translation of PCT International Searching Authority Report (Year: 2022).*

(Continued)

*Primary Examiner* — Boris D Grijalva Lobos
(74) *Attorney, Agent, or Firm* — WOMBLE BOND DICKINSON (US) LLP

(57) ABSTRACT

This application relates to the field of communication technologies, and provides a packet processing method, apparatus, and system, and a computer-readable storage medium. The method is applied to a user plane (UP) device of a virtual broadband network gateway. The UP device receives a first packet sent by a control plane (CP) device, where the first packet carries first indication information, and the first indication information indicates the UP device to perform online management on a terminal device that accesses a network through a virtual broadband network gateway; determines a proxy lease of a first terminal device based on the first packet, where the first terminal device is the terminal device that accesses the network through the virtual broadband network gateway; and performs online management on the first terminal device based on the first indication information and the proxy lease of the first terminal device.

19 Claims, 12 Drawing Sheets

(56) References Cited

OTHER PUBLICATIONS

3rd Generation Partnership Project; Technical Specification Group Core Network and Terminals; Interface between the Control Plane and the User Plane Nodes; Stage 3 (Release 17). 3GPP TS 29.244 V17.1.0 (Jun. 2021). total 345 pages.

S. Hu et.al. "Control-Plane and User-Plane Separation BNG Simple Control Channel Protocol (S-CUSP); draft-cuspdt-rtgwg-cu-separation-bng-protocol-06.txt", XP015133708,2019.7.3, total 127 pages.

Anonymous et.al."Technical White Paper on Cloud-based BNG with Control Plane and User Plane Separated Architecture",XP093170850,Feb. 25, 2017,,total 12 pages.

Anonymous et.al."China Mobile and Huawei Release Technical white Paper on Cloud-based BNG with Control Plane and User Plane Separated Architecture—huawei press center".XP093170853,Feb. 25, 2017,total 4 pages.

Broadband Forum et.al."TR-459 Control and User Plane Separation for a disaggregated Bng", 3GPP Draft; C4-203064,XP051882750,2020-5-14, total 103 pages.

* cited by examiner

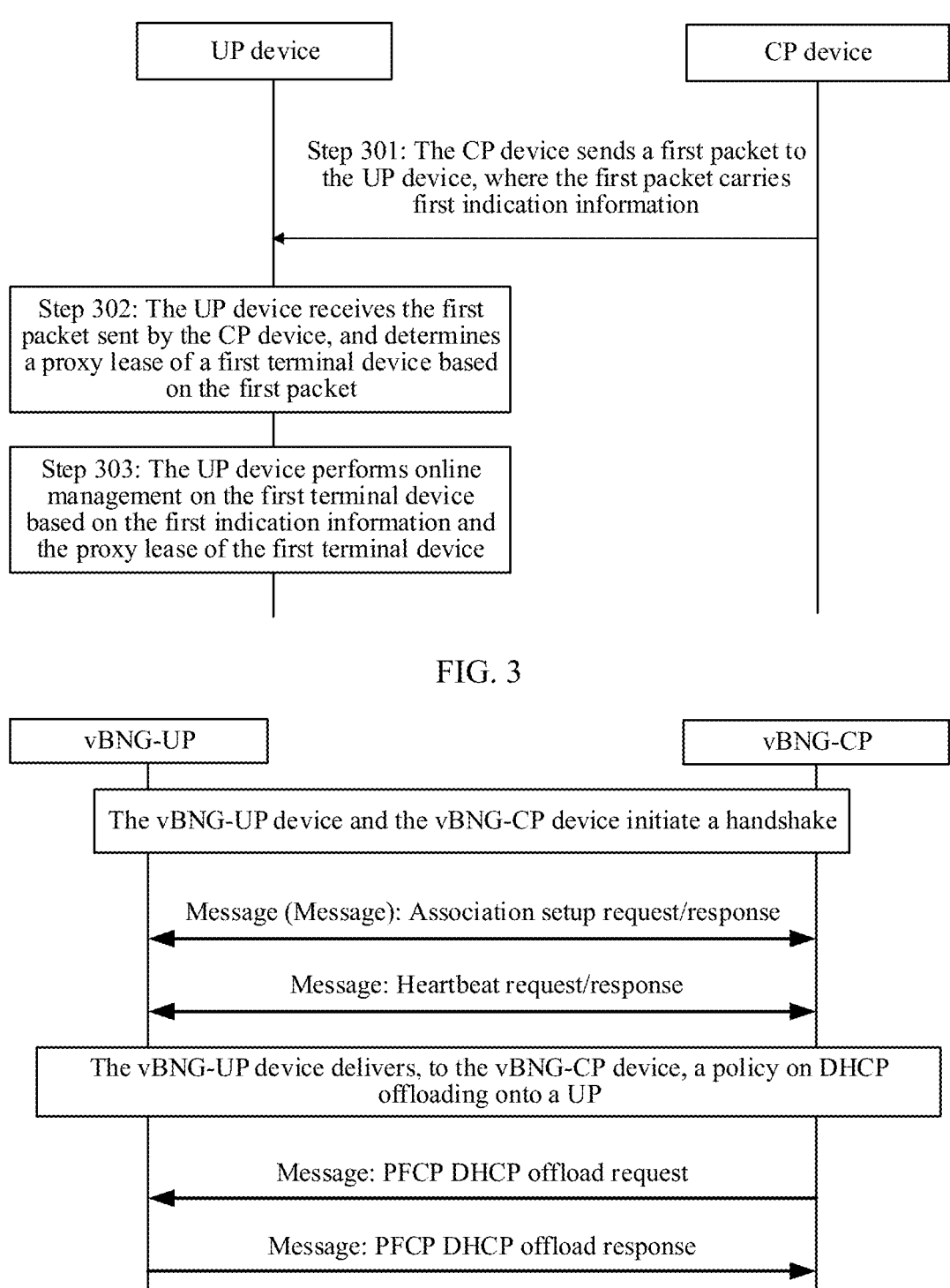

| UP device | | CP device |

Step 301: The CP device sends a first packet to the UP device, where the first packet carries first indication information Step 302: The UP device receives the first packet sent by the CP device, and determines a proxy lease of a first terminal device based on the first packet Step 303: The UP device performs online management on the first terminal device based on the first indication information and the proxy lease of the first terminal device

FIG. 3

| vBNG-UP | | vBNG-CP |

The vBNG-UP device and the vBNG-CP device initiate a handshake

Message (Message): Association setup request/response

Message: Heartbeat request/response

The vBNG-UP device delivers, to the vBNG-CP device, a policy on DHCP offloading onto a UP Message: PFCP DHCP offload request Message: PFCP DHCP offload response

FIG. 4

| Message type value | Message |
| --- | --- |
| 20 | PFCP DHCP offload request |
| 21 | PFCP DHCP offload response |

FIG. 5

| IE | P | Condition/Comment | IE type |
| --- | --- | --- | --- |
| Node ID | M | vBNG-CP device number | Node ID |
| DHCP offload | C | DHCP processing is offloaded onto a vBNG-UP, and only one IE: DHCP offload is carried | DHCP offload (extension required) |
| Remove DHCP offload | C | The offloading of the DHCP processing onto the vBNG-UP is removed, and only one IE: remove DHCP offload is carried | Remove DHCP offload (extension required) |

FIG. 6

| IE | P | Condition/Comment | IE type |
| --- | --- | --- | --- |
| Node ID | M | vBNG-UP device number | Node ID |
| Cause | M | Processing result | Cause |

FIG. 7

| Octets 1 and 2 | | DHCP offload IE type=XX | |
|---|---|---|---|
| Octets 3 and 4 | | Length=n | |
| Octets 5 and 6 | | Enterprise ID=XX | |
| IE | P | Condition/Comment | IE type |
| DHCP-proxy-lease | C | After DHCP processing is offloaded onto a vBNG-UP device, the vBNG-UP device responds to a proxy lease of a terminal device; and if a vBNG-CP device configures the proxy lease, this attribute needs to be carried; or if the proxy lease is not configured, the vBNG-UP device uses a server lease as the proxy lease | DHCP-proxy-lease (extension required) |

FIG. 8

| Octets | Bits | | | | | | | |
|---|---|---|---|---|---|---|---|---|
| | 8 | 7 | 6 | 5 | 4 | 3 | 2 | 1 |
| Octets 1 and 2 | Type=XX | | | | | | | |
| Octets 3 and 4 | Length=n | | | | | | | |
| Octets 5 and 6 | Enterprise ID=XX | | | | | | | |
| Octet 7 | Timer unit | | | | Timer value | | | |
| Octets 8 to n+4 | These octets exist only when being clearly defined | | | | | | | |

FIG. 9

| IE | P | Condition/Comment | IE type |
|---|---|---|---|
| Report type | M | Report type | Report type |
| Old CP F-SEID | M | Corresponding session SEID allocated by a CPF | F-SEID |
| Usage report | C | When the report type is a resource usage report, the IE needs to be carried; and the IE may carry a plurality of resource reports displayed in a form of a resource report list | Usage report (extension required) |

FIG. 14

| Octets 1 and 2 | Usage report IE type=XX | | |
|---|---|---|---|
| Octets 3 and 4 | Length=n | | |
| Octets 5 and 6 | Enterprise ID=XX | | |
| IE | P | Condition/Comment | IE type |
| URR ID | M | Usage report rule ID | URR ID |
| UR-SEQN | M | Resource report message sequence number | UR-SEQN |
| Usage report trigger | C | Resource report trigger cause | Usage report trigger |

FIG. 15

| Octets | | | | Bits | | | | |
|---|---|---|---|---|---|---|---|---|
| | 8 | 7 | 6 | 5 | 4 | 3 | 2 | 1 |
| Octets 1 and 2 | Type=XX | | | | | | | |
| Octets 3 and 4 | Length=n | | | | | | | |
| Octet 5 | X1 | X2 | X3 | X4 | X5 | X6 | X7 | X8 |
| Octet 6 | X9 | X10 | X11 | X12 | X13 | X14 | X15 | X16 |
| Octet 7 | X17 | X18 | DHCPR | X18 | X19 | X20 | X21 | X22 |
FIG. 16
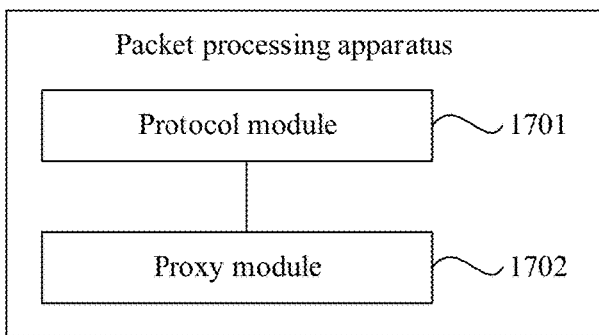
FIG. 17
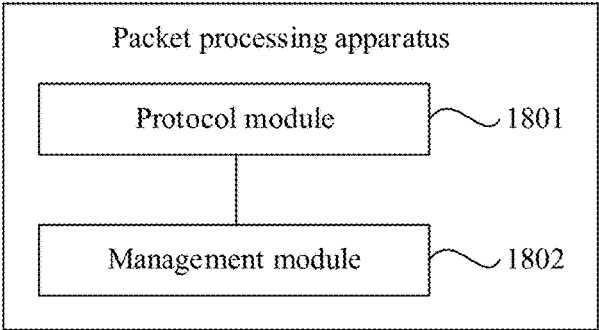
FIG. 18

PACKET PROCESSING METHOD, APPARATUS, AND SYSTEM, AND COMPUTER-READABLE STORAGE MEDIUM

CROSS-REFERENCE TO RELATED APPLICATIONS

This application is a continuation of International Application No. PCT/CN2022/101308, filed on Jun. 24, 2022, which claims priority to Chinese Patent Application No. 202110772864.5, filed on Jul. 8, 2021 and Chinese Patent Application No. 202111016498.7, filed on Aug. 31, 2021. All of the aforementioned patent applications are hereby incorporated by reference in their entireties.

TECHNICAL FIELD

This application relates to the field of communication technologies, and in particular, to a packet processing method, apparatus, and system, and a computer-readable storage medium.

BACKGROUND

A broadband network gateway (BNG) is a bridge for a terminal device to access a broadband network. The BNG is mainly configured to manage a session initiated by the terminal device, forward traffic of the terminal device, and so on. With development of a software-defined networking (SDN) technology and a network functions virtualization (NFV) technology, a forwarding function and a control function of the BNG need to be decoupled to improve performance of the BNG. A virtual BNG (vBNG) system whose forwarding function and control function are decoupled includes at least one control plane (CP) device and at least one user plane (UP) device. The CP device is configured to manage the at least one UP device, and any UP device is configured to forward the traffic of the terminal device.

Generally, after a user successfully goes online through the BNG, the user accesses a network based on an assigned Internet protocol (IP) address, and the UP device forwards traffic of the user. In a conventional technology, because the assigned IP address has a server lease, when needing to renew the lease of the IP address, the user needs to send a lease renewal request packet to the UP device; the UP device forwards the lease renewal request packet to the CP device; and the CP device processes the lease renewal request packet, to renew the lease of the IP address of the user.

SUMMARY

This application provides a packet processing method, apparatus, and system, and a computer-readable storage medium, to enable a UP device to perform online management on a terminal device.

According to a first aspect, a packet processing method is provided. The method is applied to a UP device of a virtual broadband network gateway, the virtual broadband network gateway further includes a CP device, and the method includes: The UP device receives a first packet sent by the CP device, where the first packet carries first indication information, and the first indication information indicates the UP device to perform online management on a terminal device that accesses a network through the virtual broadband access gateway; determines a proxy lease of a first terminal device based on the first packet, where the first terminal device is the terminal device that accesses the network through the virtual broadband access gateway; and performs online management on the first terminal device based on the first indication information and the proxy lease of the first terminal device.

In an embodiment, the UP device can determine the proxy lease of the first terminal device based on the first packet delivered by the CP device, and perform online management on the first terminal device based on the proxy lease of the first terminal device. In this way, the UP device can perform online management on the first terminal device without using the CP device. Therefore, in the method, the CP device may actively delegate lease management permission to the UP device, and the UP device performs online management on the terminal device based on the proxy lease, so that the virtual broadband network gateway performs online management on the terminal device more flexibly.

In an embodiment, duration of the proxy lease is less than or equal to duration of a server lease, and the server lease indicates duration in which a server allows the first terminal device to access the network.

The proxy lease and the server lease may be separately defined, in other words, a proxy lease of the UP device and the server lease that is set by the CP device are isolated from each other, so that the UP device can flexibly control lease renewal management of the first terminal device.

In an embodiment, after the receiving a first packet sent by the CP device, the method further includes: sending a second packet for the first packet to the CP device, where the second packet carries a processing result of the first packet.

Responding to the CP device with the second packet corresponding to the first packet enables the CP device to learn of a sending result of the first packet.

In an embodiment, the first packet is a packet forwarding control protocol (PFCP) packet, and carries the first indication information by using an extended information element (IE).

The CP device sends the first packet to the UP device by using the PFCP packet, so that the PFCP packet can carry the first indication information by using the IE.

In an embodiment, the performing online management on the first terminal device based on the first indication information and the proxy lease of the first terminal device includes: receiving a first lease renewal request packet sent by the first terminal device, where the first lease renewal request packet requests to renew the lease of the first terminal device; and returning a first lease renewal acknowledgment packet for the first lease renewal request packet to the first terminal device based on the first indication information and the proxy lease of the first terminal device, where the first lease renewal acknowledgment packet indicates whether the lease renewal succeeds.

The UP device returns, to the first terminal device, the first lease renewal acknowledgment packet for the first lease renewal request packet sent by the first terminal device, so that the UP device can implement lease renewal management of the first terminal device without using the CP device.

In an embodiment, when returning a first lease renewal acknowledgment packet for the first lease renewal request packet to the first terminal device based on the first indication information and the proxy lease of the first terminal device includes, the UP device returns the first lease renewal acknowledgment packet for the first lease renewal request packet to the first terminal device based on the first indication information and the proxy lease of the first terminal device when a fault occurs on a link between the UP device and the CP device.

When the fault occurs on the link between the UP device and the CP device, the UP device returns, to the first terminal device, the first lease renewal acknowledgment packet for the first lease renewal request packet sent by the first terminal device, so that the lease renewal management performed by the UP device on the first terminal device is not affected when the fault occurs on the link between the UP device and the CP device, to implement an offline holding function of the first terminal device.

In an embodiment, a second lease renewal request packet for the first terminal device is sent to the CP device based on the server lease of the first terminal device, where the server lease indicates the duration in which the server allows the first terminal device to access the network; and a second lease renewal acknowledgment packet returned by the CP device for the second lease renewal request packet is received, and the server lease of the first terminal device is updated based on the second lease renewal acknowledgment packet.

The UP device actively sends the second lease renewal request packet for the first terminal device to the server, so that the UP device can update the server lease of the first terminal device based on the second lease renewal acknowledgment packet of the server.

In an embodiment, the performing online management on the first terminal device based on the first indication information and the proxy lease of the first terminal device includes: receiving a go-offline request packet sent by the first terminal device; and returning a go-offline acknowledgment packet for the go-offline request packet to the first terminal device based on the first indication information and the proxy lease of the first terminal device when the fault occurs on the link between the UP device and the CP device.

When the fault occurs on the link between the UP device and the CP device, the UP device returns, to the first terminal device, the go-offline acknowledgment packet for the go-offline request packet sent by the first terminal device, so that go-offline management performed by the UP device on the first terminal device is not affected when the fault occurs on the link between the UP device and the CP device, to implement an offline management function of the first terminal device.

In an embodiment, the performing online management on the first terminal device based on the first indication information and the proxy lease of the first terminal device includes: caching go-offline request data of the go-offline request packet when the fault occurs on the link between the UP device and the CP device; and sending, by the UP device, a go-offline message for the first terminal device to the CP device based on the go-offline request data when the fault of the link between the UP device and the CP device is recovered, where the go-offline message indicates that the first terminal device has gone offline.

In this way, when the fault of the link between the UP device and the CP device is recovered, the CP device can learn that the first terminal device has gone offline when the fault occurs on the link between the UP device and the CP device, and then perform go-offline processing on the first terminal device on a CP device side, so that the offline first terminal device does not continue to occupy a network resource. This implements a keepalive function of the first terminal device at a user end.

In an embodiment, the go-offline message is a PFCP resource report, the PFCP resource report carries a go-offline trigger identifier by using an extended IE, and the go-offline trigger identifier is used by the CP device to perform go-offline processing on the first terminal device.

The extended IE of the PFCP resource report can carry the go-offline trigger identifier. This is compatible with an existing CP-UP interaction mechanism, so that the go-offline message can be sent to the CP device.

In an embodiment, the performing online management on the first terminal device based on the first indication information and the proxy lease of the first terminal device includes: sending the go-offline message for the first terminal device to the CP device in response to expiration of the server lease of the first terminal device, where the go-offline message indicates that the first terminal device has gone offline.

The go-offline message for the first terminal device is actively sent to the CP device based on the server lease of the first terminal device, so that the offline first terminal device does not continue to occupy the network resource. This implements the keepalive function of the first terminal device.

In an embodiment, before the performing online management on the first terminal device based on the first indication information and the proxy lease of the first terminal device, the method further includes: receiving a user entry of the first terminal device and a go-online acknowledgment packet that are sent by the CP device, where the user entry includes user information of the first terminal device, and the go-online acknowledgment packet includes the server lease of the first terminal device; and obtaining the user information of the first terminal device based on the user entry, and obtaining the server lease of the first terminal device based on the go-online acknowledgment packet.

The server lease of the first terminal device carried in the go-online acknowledgment packet forwarded in a go-online process is stored, so that the UP device can perform online management based on the server lease of the first terminal device.

In an embodiment, the determining a proxy lease of a first terminal device based on the first packet includes: determining, based on the first indication information carried in the first packet, that the server lease of the first terminal device is the proxy lease of the first terminal device.

The server lease of the first terminal device is used as the proxy lease of the first terminal device, so that the UP device can also perform online management on the first terminal device when there is no defined proxy lease.

In an embodiment, the first packet further carries a proxy lease of the UP device; and the determining a proxy lease of a first terminal device based on the first packet includes: using the proxy lease of the UP device carried in the first packet as the proxy lease of the first terminal device.

The proxy lease of the UP device carried in the first packet is used as the proxy lease of the first terminal device, so that the proxy lease and the server lease are separately defined, and therefore the UP device can flexibly control the lease renewal management of the terminal device.

In an embodiment, after the determining a proxy lease of a first terminal device based on the first packet, the method further includes: sending the proxy lease of the first terminal device to the first terminal device.

Therefore, the first terminal device can obtain the proxy lease, and then requests, based on the proxy lease, the UP device to renew the lease.

In an embodiment, after that the UP device receives a first packet sent by the CP device, the method further includes: receiving a third packet sent by the CP device, where the third packet carries information indicating to remove the first indication information, and the information indicating to remove the first indication information indicates the UP device to remove the online management of the first terminal device; and sending a fourth packet for the third packet to the CP device, where the fourth packet carries a processing result of the third packet.

The online management performed by the UP device on the first terminal device can be removed by using the third packet.

According to a second aspect, a packet processing method is provided. The method is applied to a CP device of a virtual broadband network gateway, the virtual broadband network gateway further includes a UP device, and the method includes: The CP device sends a first packet to the UP device, where the first packet carries first indication information, the first indication information indicates the UP device to perform online management on a first terminal device, and the first terminal device is a terminal device that accesses a network through the virtual broadband access gateway.

In the method, the CP device can deliver, to the UP device, the first packet that carries the first indication information, so that the UP device can perform online management on the first terminal device without using the CP device.

In an embodiment, after that the CP device sends a first packet to the UP device, the method further includes: receiving a second packet sent by the UP device for the first packet, where the second packet carries a processing result of the first packet.

In an embodiment, the first packet is a PFCP packet, and carries the first indication information by using an extended IE.

In an embodiment, the first packet further carries a proxy lease of the UP device, duration of the proxy lease is less than or equal to duration of a server lease, and the server lease indicates duration in which a server allows the first terminal device to access the network.

In an embodiment, after that the CP device sends a first packet to the UP device, the CP device sends a third lease renewal request packet to the server based on the server lease of the first terminal device when a fault occurs on a link between the CP device and the UP device, where the third lease renewal request packet requests to renew the lease of the first terminal device; receives a third lease renewal acknowledgment packet returned by the server for the third lease renewal request packet, where the third lease renewal acknowledgment packet indicates whether the lease renewal succeeds; caches lease renewal failure data in response to an indication of a lease renewal failure by the third lease renewal acknowledgment packet; and performs go-offline processing on the first terminal device based on the lease renewal failure data when the fault of the link between the CP device and the UP device is recovered.

When the fault occurs on the link between the CP device and the UP device, the CP device cannot receive a lease renewal request packet sent by the UP device, and can actively send the third lease renewal request packet of the first terminal device to the server, so that the first terminal device is not forced to go offline because the server cannot receive the third lease renewal request packet of the first terminal device, to maintain occupation of a user address on the server.

In an embodiment, after that the CP device sends a first packet to the UP device, the method further includes: receiving a second lease renewal request packet for the first terminal device sent by the UP device, sending the second lease renewal request packet to the server, and receiving a second lease renewal acknowledgment packet returned by the server for the second lease renewal request packet; and returning the second lease renewal acknowledgment packet to the UP device, where the second lease renewal acknowledgment packet is used by the UP device to update the server lease of the first terminal device.

In an embodiment, after that the CP device sends a first packet to the UP device, the method further includes: receiving a go-offline message sent by the UP device, where the go-offline message indicates that the first terminal device has gone offline; and performing go-offline processing on the first terminal device based on the go-offline message.

In an embodiment, the go-offline message is a PFCP resource report, the PFCP resource report carries a go-offline trigger identifier by using an extended IE, and the go-offline trigger identifier is used by the CP device to perform go-offline processing on the first terminal device.

In an embodiment, after that the CP device sends a first packet to the UP device, the method further includes: sending a third packet to the UP device, where the third packet carries information indicating to remove the first indication information, and the information indicating to remove the first indication information indicates the UP device to remove the online management of the first terminal device; and receiving a fourth packet sent by the UP device for the third packet, where the fourth packet carries a processing result of the third packet.

According to a third aspect, a packet processing apparatus is provided. The apparatus is used in a UP device of a virtual broadband network gateway, the virtual broadband network gateway further includes a CP device, and the apparatus includes:

a protocol module, configured to receive a first packet sent by the CP device, where the first packet carries first indication information, and the first indication information indicates the UP device to perform online management on a terminal device that accesses a network through the virtual broadband access gateway; and a proxy module, configured to: determine a proxy lease of a first terminal device based on the first packet, where the first terminal device is the terminal device that accesses the network through the virtual broadband access gateway; and perform online management on the first terminal device based on the first indication information and the proxy lease of the first terminal device.

In an embodiment, duration of the proxy lease is less than or equal to duration of a server lease, and the server lease indicates duration in which a server allows the first terminal device to access the network.

In an embodiment, the protocol module is further configured to send a second packet for the first packet to the CP device, where the second packet carries a processing result of the first packet.

In an embodiment, the first packet is a PFCP packet, and carries the first indication information by using an extended IE.

In an embodiment, the proxy module is configured to: receive a first lease renewal request packet sent by the first terminal device, where the first lease renewal request packet requests to renew the lease of the first terminal device; and return a first lease renewal acknowledgment packet for the first lease renewal request packet to the first terminal device based on the first indication information and the proxy lease of the first terminal device, where the first lease renewal acknowledgment packet indicates whether the lease renewal succeeds.

In an embodiment, the proxy module is configured to return the first lease renewal acknowledgment packet for the first lease renewal request packet to the first terminal device based on the first indication information and the proxy lease of the first terminal device when a fault occurs on a link between the UP device and the CP device.

In an embodiment, the protocol module is further configured to: send a second lease renewal request packet for the first terminal device to the CP device based on the server lease of the first terminal device, where the server lease indicates the duration in which the server allows the first terminal device to access the network; and receive a second lease renewal acknowledgment packet returned by the CP device for the second lease renewal request packet, and update the server lease of the first terminal device based on the second lease renewal acknowledgment packet.

In an embodiment, the proxy module is configured to: receive a go-offline request packet sent by the first terminal device; and return a go-offline acknowledgment packet for the go-offline request packet to the first terminal device based on the first indication information and the proxy lease of the first terminal device when the fault occurs on the link between the UP device and the CP device.

In an embodiment, the proxy module is configured to cache go-offline request data of the go-offline request packet when the fault occurs on the link between the UP device and the CP device; and the protocol module is configured to send a go-offline message for the first terminal device to the CP device based on the go-offline request data when the fault of the link between the UP device and the CP device is recovered, where the go-offline message indicates that the first terminal device has gone offline.

In an embodiment, the go-offline message is a PFCP resource report, the PFCP resource report carries a go-offline trigger identifier by using an extended IE, and the go-offline trigger identifier is used by the CP device to perform go-offline processing on the first terminal device.

In an embodiment, the protocol module is configured to send the go-offline message for the first terminal device to the CP device in response to expiration of the server lease of the first terminal device, where the go-offline message indicates that the first terminal device has gone offline.

In an embodiment, the protocol module is further configured to receive a user entry of the first terminal device and a go-online acknowledgment packet that are sent by the CP device, where the user entry includes user information of the first terminal device, and the go-online acknowledgment packet includes the server lease of the first terminal device; and the proxy module is configured to obtain the user information of the first terminal device based on the user entry, and obtain the server lease of the first terminal device based on the go-online acknowledgment packet.

In an embodiment, the proxy module is configured to determine, based on the first indication information carried in the first packet, that the server lease of the first terminal device is the proxy lease of the first terminal device.

In an embodiment, the first packet further carries a proxy lease of the UP device; and the proxy module is configured to use the proxy lease of the UP device carried in the first packet as the proxy lease of the first terminal device.

In an embodiment, the proxy module is further configured to send the proxy lease of the first terminal device to the first terminal device.

In an embodiment, the protocol module is further configured to: receive a third packet sent by the CP device, where the third packet carries information indicating to remove the first indication information, and the information indicating to remove the first indication information indicates the UP device to remove the online management of the first terminal device; and send a fourth packet for the third packet to the CP device, where the fourth packet carries a processing result of the third packet.

According to a fourth aspect, a packet processing apparatus is provided. The apparatus is used in a CP device of a virtual broadband network gateway, the virtual broadband network gateway further includes a UP device, and the apparatus includes:

a protocol module, configured to send a first packet to the UP device, where the first packet carries first indication information, the first indication information indicates the UP device to perform online management on a first terminal device, and the first terminal device is a terminal device that accesses a network through the virtual broadband access gateway.

In an embodiment, the protocol module is further configured to receive a second packet sent by the UP device for the first packet, where the second packet carries a processing result of the first packet.

In an embodiment, the first packet is a PFCP packet, and carries the first indication information by using an extended IE.

In an embodiment, the first packet further carries a proxy lease of the UP device, duration of the proxy lease is less than or equal to duration of a server lease, and the server lease indicates duration in which a server allows the first terminal device to access the network.

In an embodiment, the apparatus further includes:

a management module, configured to: send a third lease renewal request packet to the server based on the server lease of the first terminal device when a fault occurs on a link between the CP device and the UP device, where the third lease renewal request packet requests to renew the lease of the first terminal device; receive a third lease renewal acknowledgment packet returned by the server for the third lease renewal request packet, where the third lease renewal acknowledgment packet indicates whether the lease renewal succeeds; cache lease renewal failure data in response to an indication of a lease renewal failure by the third lease renewal acknowledgment packet; and perform go-offline processing on the first terminal device based on the lease renewal failure data when the fault of the link between the CP device and the UP device is recovered.

In an embodiment, the management module is further configured to: receive a second lease renewal request packet for the first terminal device sent by the UP device, send the second lease renewal request packet to the server, and receive a second lease renewal acknowledgment packet returned by the server for the second lease renewal request packet; and return the second lease renewal acknowledgment packet, where the second lease renewal acknowledgment packet is used by the UP device to update the server lease of the first terminal device.

In an embodiment, the management module is further configured to: receive a go-offline message sent by the UP device, where the go-offline message indicates that the first terminal device has gone offline; and perform go-offline processing on the first terminal device based on the go-offline message.

In an embodiment, the go-offline message is a PFCP resource report, the PFCP resource report carries a go-offline trigger identifier by using an extended IE, and the go-offline trigger identifier is used by the CP device to perform go-offline processing on the first terminal device.

In an embodiment, the protocol module is further configured to: send a third packet to the UP device, where the third packet carries information indicating to remove the first indication information, and the information indicating to remove the first indication information indicates the UP device to remove the online management of the first terminal device; and receive a fourth packet sent by the UP device for the third packet, where the fourth packet carries a processing result of the third packet.

According to a fifth aspect, a network device is provided. The network device includes a processor, the processor is coupled to a memory, the memory stores at least one program instruction or code, and the at least one program instruction or code is loaded and executed by the processor, to enable the network device to implement any one of the foregoing packet processing methods.

In an example embodiment, there are one or more processors, and there are one or more memories.

In an example embodiment, the memory may be integrated with the processor, or the memory is disposed independently of the processor.

In an embodiment, the memory may be a non-transitory memory, for example, a read-only memory (ROM). The memory and the processor may be integrated into one chip, or may be separately disposed in different chips. A type of the memory and a manner in which the memory and the processor are disposed are not limited in embodiments of this application.

According to a sixth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the communication apparatus is enabled to perform the method according to any one of the first aspect or the possible implementations of the first aspect or the method according to any one of the second aspect or the possible implementations of the second aspect.

According to a seventh aspect, a packet processing system is provided. The packet processing system includes a UP device and a CP device. The UP device is configured to perform the method according to any one of the first aspect or the possible implementations of the first aspect, and the CP device is configured to perform the method according to any one of the second aspect or the possible implementations of the second aspect.

According to an eighth aspect, a computer-readable storage medium is provided. The storage medium stores at least one instruction, and the instruction is loaded and executed by a processor, to enable a computer to implement any one of the foregoing packet processing methods.

According to a ninth aspect, a computer program (product) is provided. The computer program (product) includes computer program code; and when the computer program code is run by a computer, the computer is enabled to perform the methods in the foregoing aspects.

According to a tenth aspect, a chip is provided, including a processor, configured to invoke instructions from a memory and run the instructions stored in the memory, so that a communication device on which the chip is installed performs the methods in the foregoing aspects.

According to an eleventh aspect, another chip is provided, including an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

It should be understood that, for beneficial effects achieved by the technical solutions in the third aspect, the fourth aspect, and the fifth aspect of embodiments of this application and the corresponding possible implementations, refer to the technical effects of the first aspect, the second aspect, and the corresponding possible implementations. Details are not described herein again.

BRIEF DESCRIPTION OF DRAWINGS

FIG. 3 is a schematic diagram of interaction in a packet processing method according to an embodiment of this application;

FIG. 4 is a schematic diagram of interaction in another packet processing method according to an embodiment of this application;

FIG. 5 is a schematic diagram of an extended node-level message according to an embodiment of this application;

FIG. 6 is a schematic diagram of an IE list according to an embodiment of this application;

FIG. 7 is a schematic diagram of another IE list according to an embodiment of this application;

FIG. 8 is a schematic diagram of an extended IE according to an embodiment of this application;

FIG. 9 is a schematic diagram of an extended sub-IE according to an embodiment of this application;

FIG. 14 is a schematic diagram of another IE list according to an embodiment of this application;

FIG. 15 is a schematic diagram of another extended IE according to an embodiment of this application;

FIG. 16 is a schematic diagram of another extended sub-IE according to an embodiment of this application;

FIG. 17 is a schematic diagram of a structure of a packet processing apparatus according to an embodiment of this application;

FIG. 18 is a schematic diagram of a structure of another packet processing apparatus according to an embodiment of this application;

DESCRIPTION OF EMBODIMENTS

Figure 1:
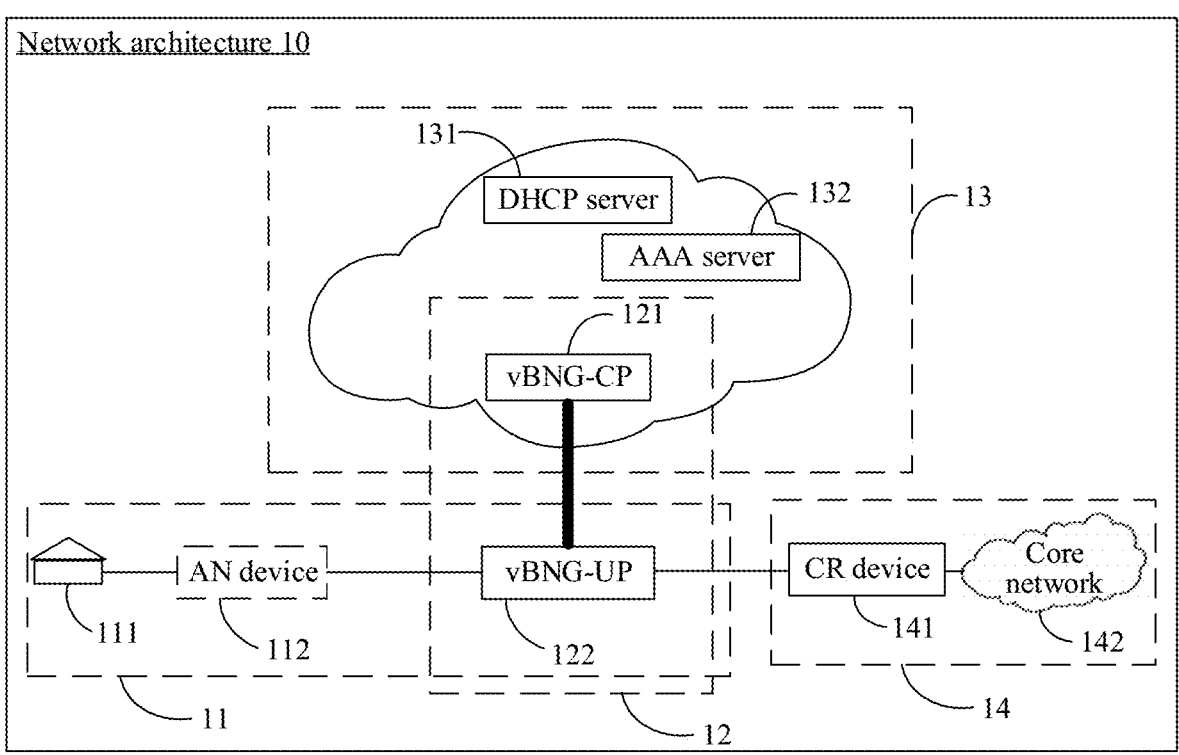
FIG. 1 is a schematic architectural diagram of a network architecture according to an embodiment of this application.

To make objectives, technical solutions, and advantages of this application clearer, the following further describes implementations of this application in detail with reference to the accompanying drawings.

Before embodiments of this application are described in detail, an application scenario of embodiments of this application is first described.

With development of an SDN technology and an NFV technology, a network architecture of a metropolitan area network evolves from a conventional network-centric network architecture to a data center—centric network architecture. In this evolution process, conventional devices such as devices evolve from professional to universal. For evolution of the conventional device from professional to universal, two types of decoupling are mainly to be implemented: decoupling of a control function from a forwarding function and decoupling of software from hardware.

As a conventional gateway device for accessing a broadband network, a BNG plays an important role in a scenario in which a user accesses the broadband network. In a process in which the user accesses the broadband network, the BNG needs to provide functions such as user management, authentication, authorization, and accounting (AAA) services, address management, a RADIUS service (where RADIUS is a document protocol for authentication, authorization, and accounting information between a network access server whose link needs to be authenticated and a shared authentication server), routing control, a point-to-point protocol over Ethernet (PPPoE) service, a dynamic host configuration protocol (DHCP) service, and a forward engine. These functions that need to be supported by the BNG are deployed on a same hardware device, and the hardware device may be a switch or the like.

With emergence of various Internet services, a higher requirement is imposed on a quantity of user sessions supported by the BNG, a higher requirement is imposed on bandwidth for a user to access a network, and especially, a higher requirement is imposed on a capability of the BNG to externally provide service openness and service programmability. Based on these factors, an SDN/NFV-based architecture of the BNG needs to implement the foregoing two types of decoupling.

According to the broadband-forum (BBF) protocol, after the forwarding function and the control function of the BNG are decoupled (in other words, a control plane and a user plane are separated, namely, CU-separated), the BNG includes at least one CP device and a plurality of UP devices. One CP device may manage a plurality of UP devices, to schedule users, traffic, and resources between the plurality of UP devices, in other words, the CP device is used in cooperation with the plurality of UP devices to implement the foregoing functions of the BNG. Compared with an integrated-hardware BNG on which decoupling is not performed, a BNG whose forwarding function and control function are decoupled is greatly improved in utilization and reliability.

The CU-separated BNG may also be referred to as a virtual broadband network gateway (vBNG). The vBNG includes at least one virtual broadband network gateway control plane (vBNG-CP) device and a plurality of virtual broadband network gateway user plane (vBNG-UP) devices. The vBNG-CP device is configured to provide functions, such as user management, AAA services, address management, a RADIUS service, a PPPoE service, and a DHCP service, that are required by the vBNG. In addition, the vBNG-CP device further needs to provide a UP device management (UP management) function required by the BNG. Any vBNG-UP device is configured to provide functions, such as routing, a multicast (multicast) service, quality of service (QoS), a forwarding service, an access control list (ACL) service, and a multi-protocol label switching (MPLS)/label distribution protocol (LDP) service, that are required by the BNG.

When the vBNG includes one vBNG-CP device and a plurality of vBNG-UP devices, the vBNG-CP device and the vBNG-UP devices may be connected through three types of interfaces. The three types of interfaces are as follows:

(1) Management interface (Mi): the Mi may use a network configuration (netconf) interface. The vBNG-CP device delivers a configuration to the vBNG-UP device through the interface. The vBNG-UP device reports some running statuses and the like through the interface.

(2) Control packet redirection interface (CPRi): the CPRi may use a general packet radio service (GPRS) tunneling protocol (GTP) interface. The CPRi is configured to implement packet forwarding between a terminal device and the vBNG-CP device. For example, when receiving a user access protocol packet sent by the terminal device, the vBNG-UP device encapsulates the user access protocol packet through the interface, and then sends the encapsulated user access protocol packet to the vBNG-CP device. The vBNG-CP device processes the user access protocol packet.

(3) State control interface (SCi): the SCi may use a PFCP interface. The vBNG-UP device reports information about the terminal device to the vBNG-CP device through the interface. The vBNG-CP device processes the user access protocol packet and completes protocol interaction of a user. After the terminal device goes online, the vBNG-CP device delivers a user entry to the corresponding vBNG-UP device through the interface. The user entry carries user information of the terminal device, so that the vBNG-UP device subsequently forwards traffic of the terminal device based on the user entry. A detailed function of the user entry is described in detail in the following embodiments.

Optionally, in the PFCP protocol, the vBNG-CP device is also referred to as a vBNG-CP function (CPF), namely, a vBNG-CPF; and the vBNG-UP device is also referred to as a vBNG-UP function (UPF), namely, a vBNG-UPF.

Because the vBNG-CP device can manage many vBNG-UP devices, all users are centrally managed on the vBNG-CP device. A process of accessing a service in the network by the terminal device usually includes two basic processes: a user go-online processing process and a user online management process. Optionally, the user online management process includes processes such as user lease renewal processing and user go-offline processing. In the BBF protocol, the user go-online processing process and the user online management process are both controlled by the vBNG-CP device.

FIG. 1 is a schematic architectural diagram of a network architecture 10 according to an embodiment of this application. The foregoing vBNG may be used in the network architecture 10. As shown in FIG. 1, the network architecture 10 includes a user end 11, a vBNG system 12, a server end 13, and a network end 14. The vBNG system 12 is a CU-separated vBNG system. Therefore, the vBNG system 12 is a broadband access gateway provided in embodiments of this application.

The user end 11 includes a terminal device 111 used by a user and a vBNG-UP 122 in the vBNG system 12. The terminal device 111 is connected to the vBNG-UP 122, and may access a network of the network end 14 through the vBNG system 12.

In an embodiment, the terminal device 111 may be connected to the vBNG-UP 122 in the vBNG system 12 through an access network (AN) device 112. The AN device 112 may be an optical line terminal (OLT) device. As a switching device, the OLT device may enable a plurality of user terminal devices including the terminal device 111 to be connected to the vBNG-UP 122.

In an embodiment, the terminal device 111 may be a user-end device supporting the address resolution protocol (ARP), a user-end device supporting the neighbor discovery protocol (ND), a user-end device supporting the point-to-point protocol (PPP), or a user-end device supporting DHCP. This is not limited in this application.

The vBNG system 12 includes a vBNG-CP 121 and the vBNG-UP 122. The vBNG-CP 121 may be configured to control and manage network access of the user end 11 connected to the vBNG-UP 122. Optionally, the vBNG-CP 121 may be further connected to a plurality of vBNG-UPs (not shown in FIG. 1) in addition to the vBNG-UP 122, to serve as a plurality of broadband access gateways to provide a network access service for a plurality of user terminal devices.

Generally, the vBNG-CP 121 is disposed at the serving end 13, and may be connected to and communicate with servers at the serving end 13 that have different functions/ purposes. For example, the vBNG-CP 121 may be connected to a DHCP server 131 at the serving end 13, so that a user terminal device using DHCP accesses the network by using an obtained dynamic IP address, to be specific, the DHCP server can assign the IP address to the user terminal device according to the DHCP protocol, so that the user terminal device can access the network by using the IP address.

For another example, the vBNG-CP 121 may be connected to and communicate with an AAA server 132 at the serving end 13, to manage a user accessing the network, and provide services such as authentication, authorization, and accounting for the user. Optionally, it is verified whether the user can obtain access permission, the user is authorized to use specific services, and a status of using a network resource by the user, for example, charging management on using the network resource by the user is recorded.

The vBNG-UP 122 is separately connected to and communicates with the terminal device 111, the vBNG-CP 121, and the network end 14, and is configured to provide a packet and/or IP data flow forwarding service for the terminal device 111.

For example, when the terminal device 111 requests to access the network of the network end 14, the vBNG-UP 122 may receive an access protocol packet of the terminal device 111, and forward the access protocol packet to the vBNG-CP 121. Alternatively, after the terminal device 111 accesses the network of the network end 14, the vBNG-UP 122 may forward an IP data flow to the network end 14 for the terminal device 111, or forward an IP data flow of the terminal device 111, or forward an IP data flow of the network end 14 to the terminal device 111.

In an embodiment of this application, during layout of the network architecture 10, based on a layout plan of the network architecture, after the vBNG-CP 121 establishes a connection to the vBNG-UP 122, the vBNG-CP 121 may determine a protocol type supported by the terminal device 111 connected to the vBNG-UP 122. This is not described in detail in this embodiment of this application.

The serving end 13 is configured to dispose servers with different functions and purposes, for example, the vBNG-CP 121, the DHCP server 131, and the AAA server 132 above. Optionally, the servers may be connected to and communicate with each other through a dedicated network. Certainly, the servers may alternatively be connected to and communicate with each other through a public network. This is not limited in embodiments of this application.

The network end 14 is configured to provide a network service for the terminal device 111. The network end 14 may include a core network 142. It should be understood that a network type of the network end 14 is not specifically limited in embodiments of this application. The network end 14 may further include a core router (CR) device 141. In this way, the vBNG-UP 122 in the vBNG system 12 may be connected to and communicate with the core network 142 of the network end 14 through the CR device 141.

Figure 2:
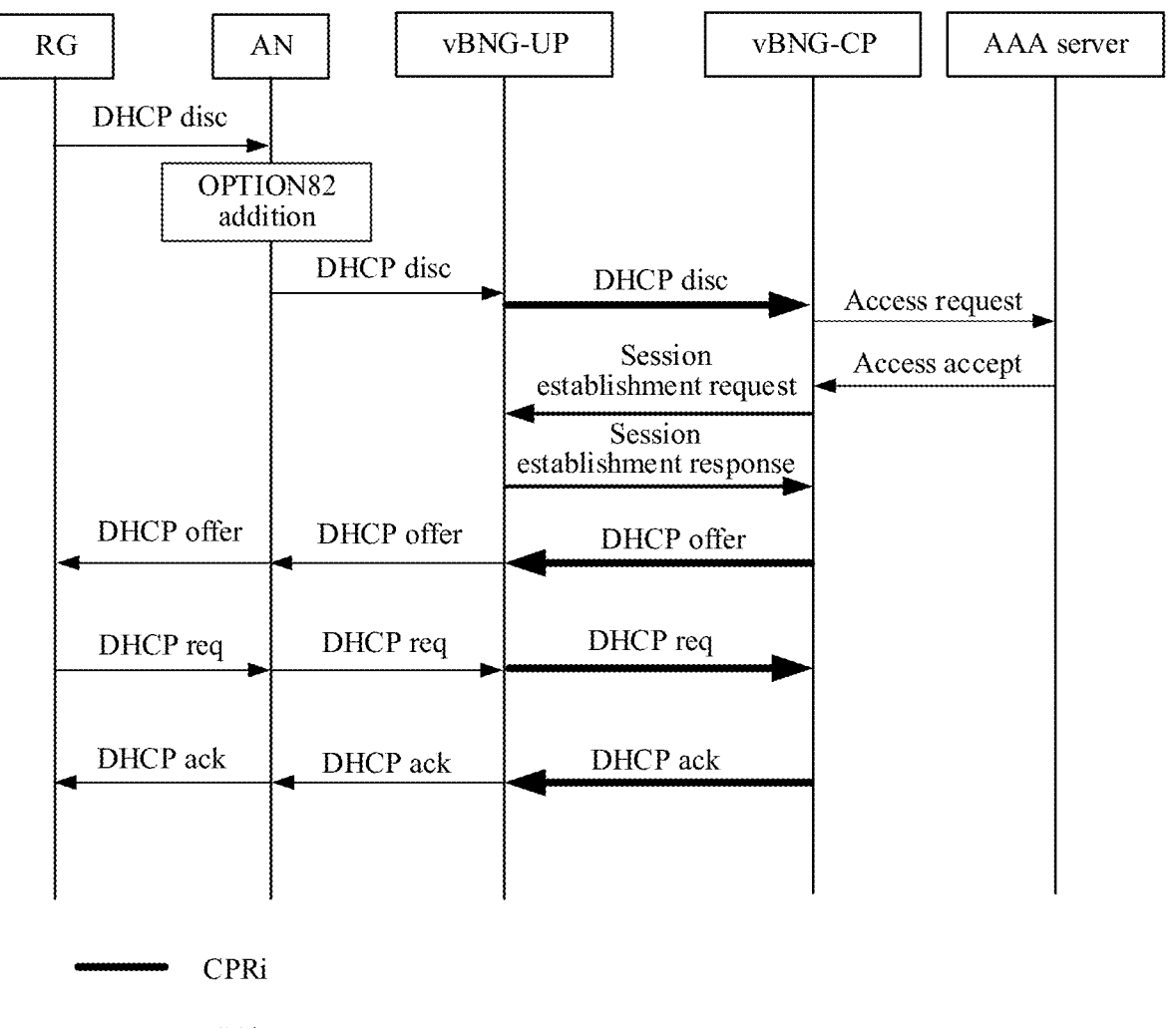
FIG. 2 is a schematic diagram of interaction in user go-online processing and user online management according to an embodiment of this application.

Based on the network architecture 10 shown in FIG. 1, an example in which the user terminal device 111 is a residential gateway (RG) and is a terminal device using DHCP is used. Refer to FIG. 2. In a conventional technology, the user go-online processing process and the user online management process include the following several operations.

1. The RG sends a DHCP discover (discover, disc) packet to the AN device to discover a DHCP server that can provide an IP address for a user.

In an embodiment, when the terminal device is the RG, the RG may be connected to a plurality of devices such as a smartphone, a desktop computer, and a portable computer, and the plurality of devices access the RG. In this case, the RG may perform network address translation (NAT) processing on the accessing device. In addition, the RG may communicate with the AN device, and perform PPPoE or IPoE dial-up or DHCP dial-up by accessing the AN device, to obtain an IP address from the BNG, and therefore access the BNG based on the obtained IP address. In this way, after the RG accesses the BNG, the device accessing the RG may access the BNG through the RG, to perform network access.

In an embodiment, when requesting the IP address for going online, a DHCP client (the RG in this embodiment of this application) does not know a location of the DHCP server. Therefore, the DHCP client sends a request packet, namely, the DHCP disc packet, in a broadcast manner in a local network, to discover the DHCP server that is in the local network and that can provide the IP address.

2. The AN device adds an operation field OPTION82 to the DHCP disc packet, and sends, to the vBNG-UP device, the DHCP disc packet to which the operation field OPTION82 is added.

In an embodiment, the operation field added by the AN device to the DHCP disc packet may alternatively be OPTION18, and the operation field OPTION82 or OPTION18 carries user information or user go-online location information of the user.

3. The vBNG-UP device sends the DHCP disc packet to the vBNG-CP device through the CPRi, where the vBNG-CP device can parse OPTION82 in the DHCP disc packet during go-online and interaction.

In an embodiment, after receiving the DHCP disc packet, the vBNG-CP device parses OPTION82 in the DHCP disc packet to broadcast the DHCP disc packet to the DHCP server. All DHCP servers that receive the DHCP disc packet send a response packet, namely, a DHCP offer packet. The DHCP client can learn of locations of the DHCP servers in the local network based on the DHCP offer packet.

4. The vBNG-CP device sends an access request packet to the AAA server based on the DHCP disc packet. Optionally, the AAA server returns an access accept (access accept) packet to the vBNG-CP device.

In an embodiment, the AAA server is configured to perform authentication on the terminal device, authorize the user to use a service, and collect a resource usage status of the user, to generate charging information.

5. The vBNG-CP device sends a session establishment request message to the vBNG-UP device through the SCi, and the vBNG-UP device sends a session establishment response message to the vBNG-CP device through the SCi, to establish a session connection between the vBNG-UP device and the vBNG-CP device.

6. The vBNG-CP device sends the DHCP offer packet to the vBNG-UP device through the CPRi, and the vBNG-UP device sends the DHCP offer packet to the RG to respond to the access request of the RG, and notifies the RG of the DHCP server that can provide the IP address.

In an embodiment, after receiving the DHCP offer packet returned by the DHCP server, the vBNG-CP device sends the DHCP offer packet to the vBNG-UP device through the CPRi. Optionally, the DHCP offer packet includes the configured IP address and a corresponding server lease, and further includes other configuration information, for example, a gateway address and a domain name system (DNS) server address.

7. After receiving the DHCP offer packet, the RG sends a DHCP request (req) packet to the vBNG-UP device, and the vBNG-UP device sends the DHCP req packet to the vBNG-CP device through the CPRi.

In a user go-online phase, the RG sends the DHCP req packet to the vBNG-CP device to request to assign the IP address. In an embodiment, the RG receives a plurality of DHCP offer packets replied by a plurality of DHCP servers. Therefore, the RG needs to select one of the plurality of received DHCP offer packets. For example, the RG selects a DHCP server corresponding to the first received DHCP offer packet as a target server, and returns a DHCP req packet to the target server, to notify the selected DHCP server.

After the user successfully goes online, the RG accesses the network by using the obtained dynamic protocol IP address. Optionally, in a protocol in which the user accesses the network by using the dynamic protocol IP address, the vBNG-CP device maintains the server lease of the IP address assigned to the RG, and periodically updates the server lease of the RG based on a use status of the IP address. When the server lease of the IP address expires, the DHCP server assigns the IP address to another terminal device for use. Therefore, the RG needs to periodically request the DHCP server to update the server lease of the IP address, to ensure that the IP address is valid and available.

In an embodiment, the RG sends the DHCP req packet to request the vBNG-CP device to renew the lease of the IP address. For example, when ½ of the use lease of the IP address expires, the RG sends the DHCP req packet to the vBNG-CP device to renew the lease; or when ⅞ of the use lease of the IP address expires, the RG sends the DHCP req packet to the vBNG-CP device to renew the lease.

8. The vBNG-CP device sends a DHCP acknowledgment (ack) packet to the vBNG-UP device through the CPRi, and the vBNG-UP device sends the DHCP ack packet to the RG for information acknowledgment.

In an embodiment, after the DHCP server receives the DHCP req packet, where the DHCP req packet is a request packet for the lease renewal, the DHCP server searches for a corresponding lease record based on user information (for example, a media access control (MAC) address of the RG) carried in the DHCP req packet; and if the corresponding lease record exists, the DHCP server sends the DHCP ack packet as a response to notify the user that the assigned IP address can be used; or if the DHCP server does not find the corresponding lease record or cannot normally assign the IP address due to some reasons, the DHCP server sends a DHCP negative acknowledgment (NAK) packet as a response to notify the user that an appropriate IP address cannot be assigned.

In an embodiment, when the user no longer needs to use the assigned IP address, the user further actively sends a DHCP release (rel) packet to the DHCP server, to notify the DHCP server that the user no longer needs the allocated IP address, and the DHCP server releases the bound server lease.

It can be learned from the user go-online processing process and the user online management process shown in FIG. 2 that after the user goes online by using the dynamic protocol IP address, the user needs to periodically send a lease renewal request packet to the DHCP server for the lease renewal, to keep the user online. However, because the DHCP req packet for the lease renewal is processed by the vBNG-CP device, when a fault occurs on a communication link between the vBNG-CP device and the vBNG-UP device, the vBNG-CP device cannot process the DHCP req packet in a timely manner. As a result, the lease renewal for the dynamic protocol IP address of the user fails, and the user is forced to go offline after the lease expires. Consequently, data traffic cannot be successfully forwarded, in other words, an offline holding function of the user cannot be implemented.

A packet processing method provided in an embodiment of this application is applied to the foregoing scenario in which the forwarding function and the control function of the BNG are decoupled, and can implement an offline holding function after a user goes online. With reference to the network architecture shown in FIG. 1, the packet processing method provided in this embodiment of this application is described by using an example in which the virtual broadband access gateway vBNG performs the method. Refer to FIG. 3. The method includes the following operations 301 to 303.

In operation 301: the CP device sends a first packet to the UP device, where the first packet carries first indication information.

The first indication information indicates the UP device to perform online management on a terminal device that accesses a network through the virtual broadband access gateway. In an embodiment of this application, the first indication information may also be referred to as a policy on DHCP offloading onto a UP. In an embodiment, the CP device sends the first packet to the UP device, so that after receiving the first packet, the UP device can add, based on the first indication information carried in the first packet, a function of performing online management on the terminal device that accesses the network through the virtual broadband access gateway, in other words, add a function of performing online management on the terminal device that accesses the network through the UP device.

Because the CP device and the UP device are connected through a PFCP interface, when a connection is established between the CP device and the UP device, the connection is referred to as a PFCP connection. A plurality of PFCP connections may be established between a CP device and a UP device in each pair, and control information carried on the PFCP connections is independent of each other. The control information is transmitted over the PFCP connection by using a PFCP packet. A structure of the PFCP packet includes two parts: a header field and a plurality of IEs.

In an embodiment, the first packet sent by the CP device to the UP device is a PFCP packet, and the first packet can carry the first indication information by using an extended IE.

In operation 302: the UP device receives the first packet sent by the CP device, and determines a proxy lease of a first terminal device based on the first packet.

In an embodiment, after receiving the first packet sent by the CP device, the UP device sends a second packet for the first packet to the CP device, where the second packet carries a processing result of the first packet. The second packet is used as an acknowledgment packet of the UP device for the received first packet, and is used by the UP device to notify the CP device that the first packet has been received, and the second packet carries the processing result of the first packet, to be specific, notifies the CP device whether to perform management based on an indication by the first packet. Optionally, the second packet sent by the UP device to the CP device is a PFCP packet, and the second packet can carry the processing result of the first packet by using an extended IE.

In an embodiment, the UP device performs, in response to the indication by the first indication information, online management on the terminal device that accesses the network through the virtual broadband access gateway. Because the online management includes lease renewal management and go-offline management, using an example in which the UP device performs online management on the first terminal device, the proxy lease of the first terminal device needs to be first determined based on the first packet, so that the UP device can respond to a lease renewal request of the first terminal device based on the proxy lease. The first terminal device is the terminal device that accesses the network through the virtual broadband access gateway.

In an embodiment of this application, the UP device determines the proxy lease of the first terminal device based on the first packet in the following two manners.

Manner 1: Duration of the proxy lease is equal to duration of a server lease.

In the manner 1, the duration of the proxy lease is equal to the duration of the server lease, to be specific, the duration of the proxy lease is duration that is obtained when the first terminal device accesses the network and in which a server allows the first terminal device to access the network. When the first terminal device initiates a go-online request, the first terminal device sends a go-online request packet to a DHCP server through the broadband access gateway to obtain a dynamic protocol IP address, and the DHCP server assigns the corresponding dynamic protocol IP address and use duration of the assigned dynamic protocol IP address based on a factor, for example, a go-online location of the first terminal device.

In an embodiment, before the determining a proxy lease of a first terminal device based on the first packet, the method further includes: receiving a user entry of the first terminal device and a go-online acknowledgment packet that are sent by the CP device, where the user entry includes user information of the first terminal device, and the go-online acknowledgment packet includes an OPTION82 field and the server lease of the first terminal device; and obtaining the user information of the first terminal device based on the user entry, and obtaining go-online location information and the server lease of the first terminal device based on the go-online acknowledgment packet. The user information and the go-online location information include at least one of access interface information, virtual local area network (VLAN) information, a MAC address, or an IP address of the first terminal device.

For example, the determining a proxy lease of a first terminal device based on the first packet includes: determining, based on the first indication information carried in the first packet, that the server lease of the first terminal device is the proxy lease of the first terminal device.

In an embodiment, in the manner in which the duration of the proxy lease is equal to the duration of the server lease, the server lease of the first terminal device may be obtained not only in the foregoing manner of using the go-online acknowledgment packet in a user go-online phase but also by using a proxy lease of the UP device carried in the received first packet, where duration of the proxy lease of the UP device carried in the first packet is equal to the server lease.

Manner 2: Duration of the proxy lease is less than duration of a server lease.

In the manner 2, the duration of the proxy lease that is of the first terminal device and that is determined by the UP device based on the first packet is less than the duration of the server lease, and the proxy lease and the server lease are independent of each other. To be specific, the proxy lease and the server lease are separately defined, in other words, a proxy lease of the UP device and the server lease that is set by the CP device are isolated from each other, so that the UP device can flexibly control lease renewal management of the first terminal device.

In an embodiment, the first packet further carries the proxy lease of the UP device, in other words, the CP device configures a proxy lease for the UP device, where the proxy lease is generally less than the server lease. Optionally, the proxy lease may alternatively be greater than or equal to the server lease based on different application scenarios. The CP device sends the first packet including the proxy lease of the UP device to the UP device. Optionally, the proxy lease is carried in the first indication information in the first packet.

In an embodiment, the determining a proxy lease of a first terminal device based on the first packet includes: using the proxy lease of the UP device carried in the first packet as the proxy lease of the first terminal device.

For example, the server lease of the first terminal device is two days, and the proxy lease configured by the CP device for the UP device is two hours. In this case, the UP device responds to the lease renewal request of the first terminal device based on the proxy lease, namely, two hours, and requests, based on the server lease, namely, two days, the CP device to renew the lease of the first terminal device.

In operation 303: the UP device performs online management on the first terminal device based on the first indication information and the proxy lease of the first terminal device.

According to the foregoing operation 301 and operation 302, the UP device obtains the first indication information and the proxy lease of the first terminal device, so that the UP device can perform online management on the first terminal device based on the first indication information and the proxy lease of the first terminal device. In an embodiment, that the UP device performs online management on the first terminal device based on the proxy lease of the first terminal device includes the following three cases.

Case 1: The UP device performs lease renewal management on the first terminal device based on the proxy lease of the first terminal device.

In this case, the UP device performs lease renewal management on the first terminal device based on the proxy lease of the first terminal device, in other words, responds to the lease renewal request of the first terminal device based on the proxy lease of the first terminal device.

In an embodiment, after the determining a proxy lease of a first terminal device based on the first packet, the method further includes: The UP device sends the proxy lease of the first terminal device to the first terminal device; and after receiving the proxy lease, the first terminal device periodically sends a lease renewal request to the UP device based on the proxy lease, to keep the user online. For example, the first terminal device sends the lease renewal request to the UP device when ½ or ⅞ of the proxy lease expires.

In an embodiment, the performing online management on the first terminal device based on the first indication information and the proxy lease of the first terminal device includes: receiving a first lease renewal request packet sent by the first terminal device, where the first lease renewal request packet requests to renew the lease of the first terminal device; and returning a first lease renewal acknowledgment packet for the first lease renewal request packet to the first terminal device based on the first indication information and the proxy lease of the first terminal device. The first lease renewal request packet is the lease renewal request sent by the first terminal device to the UP device based on the proxy lease, and the first lease renewal acknowledgment packet indicates whether the lease renewal succeeds.

In an embodiment, the returning a first lease renewal acknowledgment packet for the first lease renewal request packet to the first terminal device based on the first indication information and the proxy lease of the first terminal device includes: When a fault occurs on a link between the UP device and the CP device, the UP device returns, to the first terminal device based on the first indication information and the proxy lease of the first terminal device, the first lease renewal acknowledgment packet corresponding to the first lease renewal request packet.

In an embodiment of this application, when the fault occurs on the link between the UP device and the CP device, because the UP device can respond to the lease renewal request of the first terminal device based on the proxy lease, the first terminal device can succeed in the lease renewal based on the lease renewal acknowledgment returned by the UP device, and is not forced to go offline due to the fault of the link between the UP device and the CP device, to implement an offline holding function of the first terminal device.

In an embodiment, to request the server to renew the lease for the first terminal device, the UP device actively sends a lease renewal request for the first terminal device to the server based on the server lease of the first terminal device, and determines, based on a lease renewal acknowledgment returned by the server, whether the server lease of the first terminal device is successfully renewed. For example, when ½ or ⅞ of the server lease of the first terminal device expires, the UP device sends the lease renewal request for the first terminal device to the server, to renew the server lease of the first terminal device.

In an embodiment, the UP device sends a second lease renewal request packet for the first terminal device to the CP device based on the server lease of the first terminal device. The CP device receives the second lease renewal request packet for the first terminal device sent by the UP device, sends the second lease renewal request packet to the server, and receives a second lease renewal acknowledgment packet returned by the server for the second lease renewal request packet. The CP device returns the second lease renewal acknowledgment packet to the UP device. The UP device receives the second lease renewal acknowledgment packet returned by the CP device for the second lease renewal request packet, and updates the server lease of the first terminal device based on the second lease renewal acknowledgment packet.

The second lease renewal request packet for the first terminal device is a lease renewal request packet actively sent by the UP device for renewing the lease of the first terminal device. In other words, the second lease renewal request packet is a lease renewal request packet sent for the first terminal device by the UP device instead of the first terminal device.

Case 2: The UP device performs go-offline management on the first terminal device.

In the case 2, the UP device performs go-offline management on the first terminal device, to be specific, responds to a go-offline request of the first terminal device. In an embodiment, that the UP device performs go-offline management on the first terminal device includes: receiving a go-offline request packet sent by the first terminal device; and returning a go-offline acknowledgment packet for the go-offline request packet to the first terminal device. In this way, the UP device can respond to the go-offline request packet sent by the first terminal device.

In an embodiment, the performing online management on the first terminal device based on the first indication information and the proxy lease of the first terminal device includes: receiving the go-offline request packet sent by the first terminal device; and returning the go-offline acknowledgment packet for the go-offline request packet to the first terminal device based on the first indication information and the proxy lease of the first terminal device when a fault occurs on a link between the UP device and the CP device.

In an embodiment of this application, when the fault occurs on the link between the UP device and the CP device, because the UP device can respond to the go-offline request of the first terminal device based on the proxy lease, the first terminal device can successfully go offline based on the go-offline acknowledgment returned by the UP device, and a failure of the first terminal device in going offline due to the fault of the link between the UP device and the CP device is avoided, to implement a function of the first terminal device to go offline in an offline state.

In an embodiment, when the fault occurs on the link between the UP device and the CP device, the method further includes: caching go-offline request data of the go-offline request packet; and when the fault of the link between the UP device and the CP device is recovered, sending, by the UP device, a go-offline message for the first terminal device to the CP device based on the go-offline request data. The go-offline message indicates that the first terminal device has gone offline.

For example, the go-offline message is a PFCP resource report, and the PFCP resource report carries a go-offline trigger identifier by using an extended IE. This is compatible with an existing CP-UP interaction mechanism. The go-offline trigger identifier indicates that a reason for triggering the sending of the PFCP resource report is that the first terminal device has gone offline when the fault occurs on the link between the UP device and the CP device, and the CP device performs go-offline processing on the first terminal device based on the go-offline trigger identifier.

When the fault occurs on the link between the UP device and the CP device, the UP device responds to the go-offline request of the first terminal device, so that the first terminal device completes going offline in the offline state. Therefore, when the fault of the link between the UP device and the CP device is recovered, the UP device needs to send the message indicating that the first terminal device has gone offline to the CP device, so that the CP device can perform corresponding go-offline processing on the offline first terminal device. Optionally, the CP device deletes the user entry of the first terminal device, and notifies the AAA server to stop traffic-based charging on the first terminal device, so that the offline first terminal device does not continue to occupy a network resource, to implement a keepalive function of the first terminal device at the user end.

Case 3: The UP device performs go-offline management on the first terminal device based on the server lease of the first terminal device.

In the case 3, the UP device performs go-offline management on the first terminal device based on the server lease of the first terminal device, in other words, actively disconnects the first terminal device based on the server lease of the first terminal device.

For example, the performing online management on the first terminal device based on the first indication information and the proxy lease of the first terminal device includes: sending a go-offline message for the first terminal device to the CP device in response to expiration of the server lease of the first terminal device. The go-offline message indicates that the first terminal device has gone offline.

In an embodiment, if the UP device does not receive, before the server lease of the first terminal device expires, the lease renewal request sent by the first terminal device, it indicates that the first terminal device does not need to renew the lease, and the UP device does not send a lease renewal request for the first terminal device to the CP device. After the server lease of the first terminal device expires, the UP device disconnects the first terminal device by default.

In an embodiment of this application, the UP device performs online management on the first terminal device based on the first indication information and the proxy lease of the first terminal device. In addition, the CP device also performs online management on the first terminal device based on the first indication information and the server lease of the first terminal device. A sequence in which the UP device and the CP device perform online management on the first terminal device is not limited in embodiments of this application. For example, the UP device and the CP device simultaneously perform online management on the first terminal device in an interaction manner; or the UP device first performs online management on the first terminal device, and then the UP device and the CP device perform online management on the first terminal device in an interaction manner.

In an embodiment, that the CP device performs online management on the first terminal device based on the first indication information and the server lease of the first terminal device includes: The CP device sends a third lease renewal request packet to the server based on the server lease of the first terminal device when a fault occurs on a link between the CP device and the UP device, where the third lease renewal request packet requests to renew the lease of the first terminal device; receives a third lease renewal acknowledgment packet returned by the server for the third lease renewal request packet, where the third lease renewal acknowledgment packet indicates whether the lease renewal succeeds; caches lease renewal failure data in response to an indication of a lease renewal failure by the third lease renewal acknowledgment packet; and performs go-offline processing on the first terminal device based on the lease renewal failure data when the fault of the link between the CP device and the UP device is recovered. For example, the CP device sends the lease renewal request to the server when ½ or ⅞ of the server lease of the first terminal device expires.

In an embodiment of this application, when the fault occurs on the link between the CP device and the UP device, the CP device cannot receive the lease renewal request for the first terminal device sent by the UP device. In this case, the CP device actively sends the lease renewal request for the first terminal device to the server based on the server lease of the first terminal device, to obtain the lease renewal acknowledgment of the server to the first terminal device. Therefore, even when the fault occurs on the link between the CP device and the UP device, the first terminal device is not forced to go offline because the server cannot receive the lease renewal request for the first terminal device, and occupation of a user address on the server is maintained.

In addition, when the server returns the lease renewal failure, the CP device can actively notify the UP device of the lease renewal failure message when the fault of the link between the CP device and the UP device is recovered, so that the UP device does not continue to send a lease renewal request to the server when the server has returned the lease renewal failure.

In an embodiment, that the CP device performs online management on the first terminal device based on the first indication information and the server lease of the first terminal device includes: receiving a go-offline message sent by the UP device, where the go-offline message indicates that the first terminal device has gone offline; and performing go-offline processing on the first terminal device based on the go-offline message.

The foregoing content describes the online management process performed by the UP device on the first terminal device after the CP device sends the first indication information to the UP device by using the first packet and the online management process performed by the UP device and the CP device on the first terminal device when the fault occurs on the link between the CP device and the UP device. Based on this, the offline holding function of the first terminal device is implemented.

In an embodiment, after the CP device sends the first indication information to the UP device, the CP device may further remove the function of the UP device in performing online management on the first terminal device that accesses the network through the virtual broadband access gateway.

For example, the CP device sends a third packet to the UP device, where the third packet carries information indicating to remove the first indication information, and the information indicating to remove the first indication information indicates the UP device to remove the online management of the first terminal device. The UP device receives the third packet sent by the CP device, and sends a fourth packet for the third packet to the CP device, where the fourth packet carries a processing result of the third packet. The CP device receives the fourth packet sent by the UP device for the third packet.

In an embodiment, the third packet and the fourth packet are PFCP packets, the third packet carries, by using an extended IE, the information indicating to remove the first indication information, and the fourth packet carries the processing result of the third packet by using an extended IE.

In response to that the UP device receives the information that indicates to remove the first indication information and that is carried in the third packet, the UP device no longer performs online management on the first terminal device that accesses the network through the virtual broadband access gateway, and the CP device continues to independently perform online management on the first terminal device that accesses the network through the virtual broadband access gateway.

According to the packet processing method provided in this embodiment of this application, the UP device can determine the proxy lease of the first terminal device based on the first packet delivered by the CP device, and perform online management on the first terminal device based on the proxy lease of the first terminal device. In this way, the UP device can perform online management on the first terminal device without using the CP device. To be specific, the CP device may actively delegate lease management permission to the UP device, and the UP device performs online management on the terminal device based on the proxy lease, so that the virtual broadband network gateway performs online management on the terminal device more flexibly.

For ease of understanding, the packet processing method provided in embodiments of this application is described below based on the following several scenarios by using an example in which a DHCP user uses the first terminal device, the UP device is a vBNG-UP device, and the CP device is a vBNG-CP device.

Scenario 1: Scenario in which the vBNG-CP device delivers, to the vBNG-UP device, a policy on DHCP offloading onto a UP In the scenario 1, the vBNG-CP device delivers, to the vBNG-UP device, the policy on DHCP offloading onto a UP, where the policy on DHCP offloading onto a UP is the first indication information in embodiments of this application, so that the vBNG-UP device can process a DHCP packet without using the vBNG-CP device, to implement an offline holding function of the DHCP user. FIG. 4 is a schematic diagram of interaction in a packet processing method according to an embodiment of this application.

In an embodiment, as shown in FIG. 4, before the vBNG-CP device delivers, to the vBNG-UP device, the policy on DHCP offloading onto a UP, the vBNG-CP device and the vBNG-UP device need to first initiate a handshake, to set up an association between the vBNG-CP device and the vBNG-UP device. Optionally, the vBNG-UP device and the vBNG-CP device send a message to each other to set up a session association, where the message is an association setup request/response, or is a heartbeat request/response.

In an embodiment, after the vBNG-CP device and the vBNG-UP device initiate the handshake, the vBNG-CP device delivers, to the vBNG-UP device, the policy on DHCP offloading onto a UP. Optionally, the policy on DHCP offloading onto a UP is delivered by sending messages. The messages are respectively a PFCP DHCP offload request (offload request) and a PFCP DHCP offload response. The PFCP DHCP offload request corresponds to the first packet in embodiments of this application, and the PFCP DHCP offload response corresponds to the second packet in embodiments of this application.

A message defined in the PFCP protocol does not include a message for the policy on DHCP offloading onto a UP. Therefore, in embodiments of this application, a node (node)-level message is extended according to the PFCP protocol, and a request and a response for the policy on DHCP offloading onto a UP are implemented based on an extended node-level message.

For example, FIG. 5 is a schematic diagram of an extended node-level message. As shown in FIG. 5, a message type value of a message: PFCP DHCP offload request is 20, and a message type value of a message: PFCP DHCP offload response is 21. Optionally, the type value of the extended node-level message is not limited in embodiments of this application. The type value of the extended node-level message may be any value between 16 and 49. Because the type value between 16 and 49 is for an unused node-level message, the message: PFCP DHCP offload request and the message: PFCP DHCP offload response can be obtained through extension.

The message: PFCP DHCP offload request is a request for the policy on DHCP offloading onto a UP, and the message: PFCP DHCP offload response is a response for the policy on DHCP offloading onto a UP. In an embodiment, refer to FIG. 4. The vBNG-CP device sends the message: PFCP DHCP offload request to the vBNG-UP device to deliver, to the vBNG-UP device, the request for the policy on DHCP offloading onto a UP, and the vBNG-UP device sends the message: PFCP DHCP offload response to the vBNG-CP device to respond to the received request for the policy on DHCP offloading onto a UP. In this way, the vBNG-CP device delivers, to the vBNG-UP device, the policy on DHCP offloading onto a UP, and the vBNG-UP device can process the request sent by CPE.

In an embodiment, FIG. 6 is a schematic diagram of an IE list carried in the message: PFCP DHCP offload request. The IE list includes three IEs: a node identification (ID), where an identifier is M, a condition/comment (condition/comment) is a vBNG-CP device number, and an IE type is a node ID; a DHCP offload, where an identifier is C, a condition/comment is that DHCP online management is offloaded onto the vBNG-UP and only one IE: DHCP offload is carried, and an IE type is DHCP offload (extension required); and a remove (remove) DHCP offload, where an identifier is C, a condition/comment is that the offloading of the DHCP online management onto the vBNG-UP is removed and only one IE: remove DHCP offload is carried, and an IE type is a remove DHCP offload (extension required).

The IE: DHCP offload carries a condition for offloading the DHCP online management onto the vBNG-UP, and the IE: remove DHCP offload carries a condition for removing the offloading of the DHCP online management onto the vBNG-UP device. In an embodiment, if the message: PFCP DHCP offload request sent by the vBNG-CP device to the vBNG-UP device includes the IE: DHCP offload, it indicates that the vBNG-CP device offloads the DHCP online management onto the vBNG-UP. If the message: PFCP DHCP offload request sent by the vBNG-CP device to the vBNG-UP device includes the IE: remove DHCP offload, it indicates that the vBNG-CP device removes the offloading of the DHCP online management onto the vBNG-UP.

In an embodiment, FIG. 7 is a schematic diagram of an IE list carried in the message: PFCP DHCP offload response. The IE list includes two IEs: a node ID, where an identifier is M, a condition/comment is a vBNG-UP device number, and an IE type is a node ID; and a cause, where an identifier is M, a condition/comment is a processing result, and an IE type is a cause.

Optionally, content of the IE list in the message: PFCP DHCP offload request or the message: PFCP DHCP offload response is not limited in embodiments of this application, and may be flexibly modified based on a requirement of an application scenario, where for example, any IE is deleted or added.

Meanings of the identifiers of the IEs are enumerated in Table 1. The identifier M means being mandatory, in other words, the IE needs to be carried when the message is sent. The identifier C means being mandatory when a specific condition is met, in other words, when the message is sent, the IE needs to be carried when a specific condition is met, and the specific condition may be flexibly set based on a requirement. The identifier CO means being optional when a specific condition is met, in other words, when the message is sent, the IE may be optionally carried or not carried when a specific condition is met, and the specific condition may be flexibly set based on a requirement. The identifier 0 means being optional, in other words, when the message is sent, the IE may be optionally carried or not carried.

TABLE 1

| Categories indicating whether IEs exist in this service process | Description |
|---|---|
| Mandatory (mandatory) (M) | Being mandatory |
| Conditional (conditional) (C) | Being mandatory when a specific condition is met |
| Conditional-optional (conditional-optional) (CO) | Being optional when a specific condition is met |
| Optional (optional) (O) | Being optional |

To be specific, the IE: node ID is mandatory, and the message: PFCP DHCP offload request needs to include the IE: node ID to carry the vBNG-CP device number. The IE: DHCP offload needs to be carried when a specific condition is met. When the condition for offloading the DHCP online management onto the vBNG-UP is met, the message: PFCP DHCP offload request includes the IE: DHCP offload to carry a request for a DHCP offloading processing policy. The IE: remove DHCP offload needs to be carried when a specific condition is met. When the condition for removing the offloading of the DHCP online management onto the vBNG-UP is met, the message: PFCP DHCP offload request includes the IE: remove DHCP offload to carry a request for removing the DHCP offloading processing policy.

In embodiments of this application, the IE is an attribute, and is in a nesting relationship. Optionally, IE nesting manners are classified into a grouped IE and an embedded IE. The embedded IE is an attribute of a minimum unit, and the grouped IE may include a plurality of embedded IEs. In embodiments of this application, the IE: DHCP offload is a grouped IE, and a type of the IE: DHCP offload is extension required. Optionally, a result of extending the IE: DHCP offload is shown in FIG. 8.

Refer to FIG. 8. An extended IE: DHCP offload includes a sub-IE: DHCP-proxy (proxy)-lease. An identifier of the sub-IE: DHCP-proxy-lease is C, indicating that the sub-IE: DHCP-proxy-lease needs to be carried when the IE: DHCP offload meets a specific condition. A condition for the IE: DHCP-proxy-lease is: After the DHCP online management is offloaded onto the vBNG-UP device, the vBNG-UP device responds to a proxy lease of the terminal device. If the vBNG-CP device configures the proxy lease, this attribute needs to be carried. If the proxy lease is not configured, the vBNG-UP device uses a server lease as the proxy lease.

Meanings of octets in the IE attribute are described in the following Table 2. It can be learned based on the meanings of the octets enumerated in Table 2 that, octets 1 and 2 represent a type of the IE: DHCP offload and occupy two octets, and a data type is decimal. For example, 32768 to 65535 are vendor-defined IE types. Octets 3 and 4 represent a length and occupy two octets, and a data type is decimal. For example, the length=n, where n is a positive integer greater than 1. The value n of the length does not include the four octets of the type and length parts. An enterprise ID is a vendor number of a production enterprise and occupies two octets, and a data type is decimal. For example, 3561 is an enterprise ID of the BBF. A data part or a sub-IE, for example, the sub-IE: DHCP-proxy-lease, follows an octet 7.

TABLE 2

| Type | Is a type of the IE, occupies two octets, and is decimal. For example, 32768 to 65535 are vendor-defined IEs. |
|---|---|
| Length | Is a length, occupies two octets, is decimal, and does not include the four octets of the type and length parts. |
| Enterprise ID | Is a vendor number of the vendor of the vendor-defined IE, occupies two octets, and is decimal. For example, a vendor number of the BBF is 3561. |
| Data or sub-IE | Is a data part or a sub-IE. |

A type of the sub-IE: DHCP-proxy-lease is extension required, and the sub-IE: DHCP-proxy-lease is extended to carry a value of the proxy lease. For example, a result of extending the sub-IE: DHCP-proxy-lease is shown in FIG. 9. As shown in FIG. 9, each octet includes eight bits (bits). For meanings of octets 1 to 6, refer to the content enumerated in Table 2. Bits 5 to 1 of an octet 7 indicate a binary-coded timer value, and bits 8 to 6 indicate a unit for defining the timer value. Eight bits of octets 8 to n+4 exist only when being clearly defined. For example, the bits 8 to 6 include the following four definitions: Values of the bits 8 to 6 being 000 indicate progressive increase at a multiple of one second; values of the bits 8 to 6 being 001 indicate progressive increase at a multiple of one minute; values of the bits 8 to 6 being 010 indicate progressive increase at a multiple of one hour; and values of the bits 8 to 6 being 011 indicate progressive increase at a multiple of 24 hours.

In the foregoing packet processing process, the vBNG-CP device delivers, to the vBNG-UP device, the policy on offloading the DHCP online management onto the UP, so that the vBNG-UP device can process a request packet sent by the DHCP user, for example, a lease renewal packet or a go-offline packet sent by the DHCP user. In this way, when the fault occurs on the link between the vBNG-CP device and the vBNG-UP device, the vBNG-UP device can process, in a timely manner, the request packet sent by the DHCP user. This avoids a case in which the DHCP user goes offline due to no response to the request packet, to implement the offline holding function of the DHCP user.

After the vBNG-CP device delivers, to the vBNG-UP device, the policy on offloading the DHCP online management onto the UP, the following describes a go-online processing process of the DHCP user and an online management process of the DHCP user based on the following scenarios 2 to 5.

Figure 10:
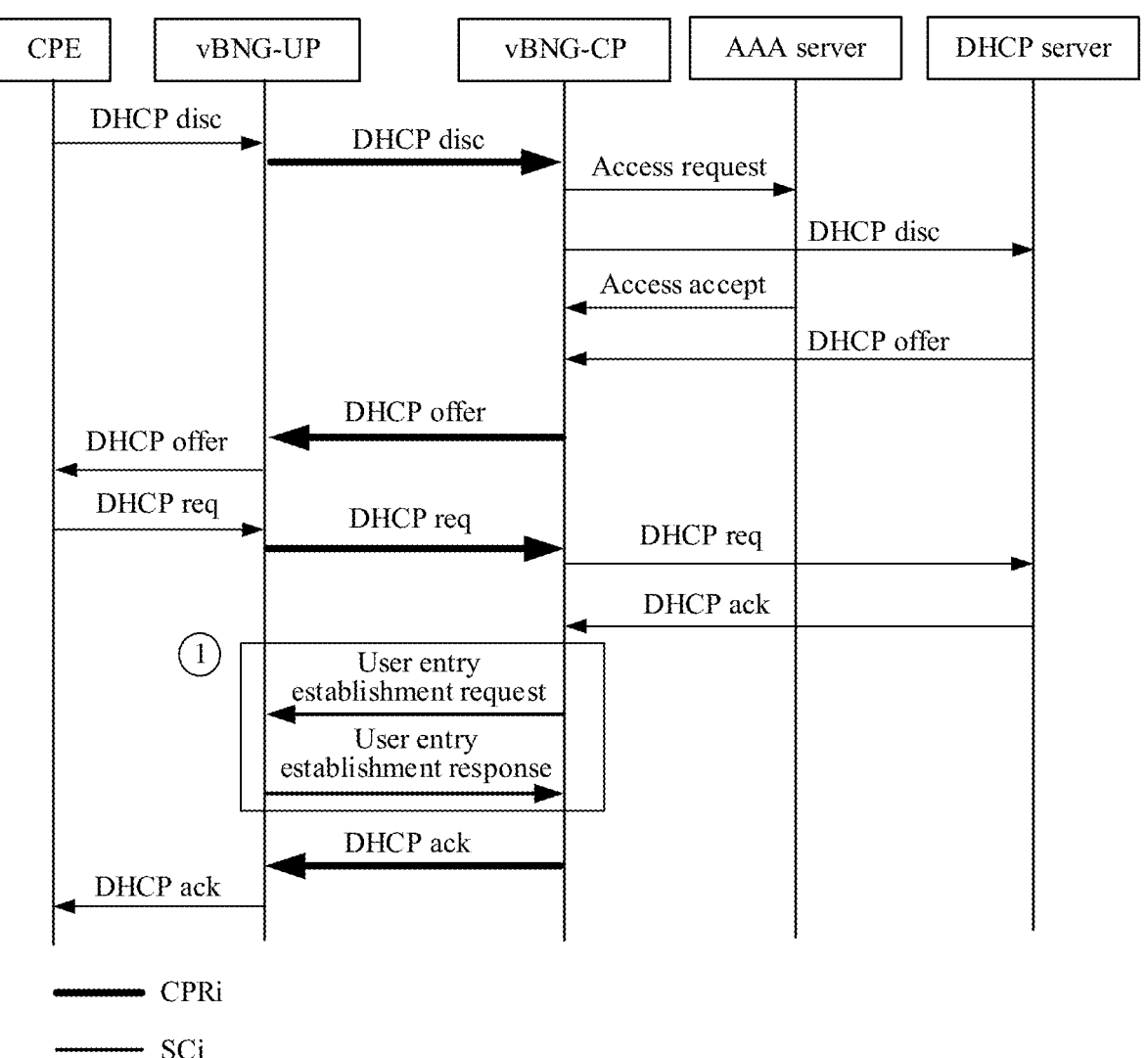
FIG. 10 is a schematic diagram of interaction in another packet processing method according to an embodiment of this application.

Scenario 2: Scenario in which the DHCP user accesses the network through the vBNG system An example in which customer premises equipment (CPE) is the first terminal device of the DHCP user is used in the scenario 2. For a process in which the CPE accesses the network (in other words, the DHCP user goes online) through the vBNG system, refer to FIG. 10. FIG. 10 is a schematic diagram of interaction in a packet processing method according to an embodiment of this application.

As shown in FIG. 10, the CPE sends a DHCP disc packet to the vBNG-UP device. The vBNG-UP device sends the DHCP disc packet to the vBNG-CP device through a CPRi. The vBNG-CP device sends an access request packet to the AAA server based on the DHCP disc packet. The AAA server returns an access accept packet to the vBNG-CP device. The vBNG-CP device broadcasts the DHCP disc packet to a DHCP server. A DHCP server that can provide an IP address returns a DHCP offer packet for response. The vBNG-CP device sends the DHCP offer packet to the vBNG-UP device through the CPRi. The vBNG-UP device returns the DHCP offer packet to the CPE. After receiving the DHCP offer packet, the CPE sends a DHCP req packet to the target DHCP server through the vBNG-UP device and the vBNG-CP device to notify the DHCP server. The DHCP server finds, based on the received DHCP req packet, a lease record corresponding to the user, and returns a DHCP ack packet to the CPE through the vBNG-CP device and the vBNG-UP device. The DHCP ack packet includes an OPTION82 field, and the OPTION82 field includes information such as a packet type and a server lease, to notify the user that the assigned IP address can be used.

Refer to ① in FIG. 10. After the vBNG-CP device receives the DHCP ack packet, the vBNG-CP device sends a user entry establishment request to the vBNG-UP device through an SCi, in other words, the vBNG-CP device delivers a user entry to the vBNG-UP device. The user entry includes user information of the user, and the user information includes at least one of access interface information, VLAN information, a MAC address, or an IP address of the user. The vBNG-UP device responds to the user entry establishment request with a user entry establishment response, and obtains the user information of the user based on the user entry. In addition, the vBNG-UP device may further obtain, based on the received DHCP ack packet, OPTION information carried in the DHCP ack packet, to obtain the server lease of the IP address of the user.

In this embodiment of this application, the vBNG-CP device delivers the user information of the user to the vBNG-UP device, so that the vBNG-UP device can obtain and store the user information of the user, and obtain and store the server lease of the user by using the received DHCP ack packet. After the user goes online successfully, the vBNG-UP device can respond to the DHCP req packet or a DHCP rel packet of the CPE based on the stored user information and server lease without using the vBNG-CP device. In other words, the vBNG-UP device can perform online management on the CPE.

For example, if the user goes online through a layer 2 network, the delivered user information includes the access interface information, the VLAN, and the MAC address of the user, to identify the DHCP packet of the CPE. If the user goes online through a layer 3 network, the delivered user information includes the IP address of the user, to identify the DHCP packet of the CPE. In the layer 2 network, communication can be implemented only through MAC addressing but only within one collision domain. In the layer 3 network, inter-network-segment communication s can be implemented through IP routing across a plurality of collision domains.

Figure 11:
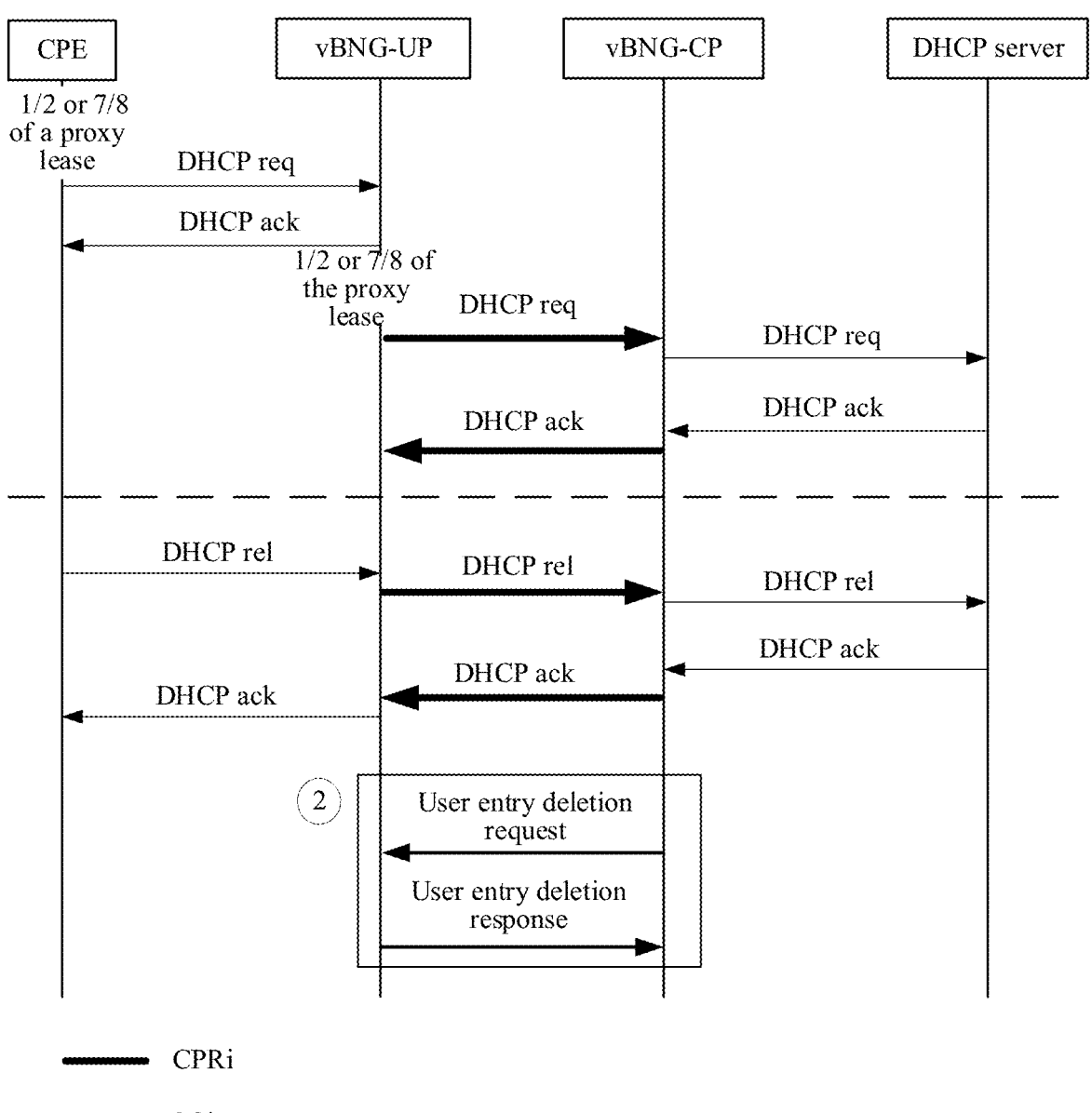
FIG. 11 is a schematic diagram of interaction in another packet processing method according to an embodiment of this application.

Scenario 3: Scenario in which the link between the vBNG-CP device and the vBNG-UP device is normal after the DHCP user goes online through the vBNG system In the scenario 3, an example in which CPE is the terminal device of the DHCP user is used. When the link between the vBNG-CP device and the vBNG-UP device is normal, for an online management process after the CPE accesses the network through the vBNG system, refer to FIG. 11. FIG. 11 is a schematic diagram of interaction in a packet processing method according to an embodiment of this application.

As shown in FIG. 11, a part above a dotted line is an online lease renewal processing process of the user. When ½ or ⅞ of a proxy lease of the CPE expires, the CPE sends a lease renewal request (namely, a DHCP req packet) to the vBNG-UP device to renew the lease. After receiving the DHCP req packet, the vBNG-UP device makes a response based on user information and a server lease that are obtained when the user goes online, and returns a DHCP ack packet to the CPE. In this process, the vBNG-UP device does not need to send the DHCP req packet to the vBNG-CP device to cause the vBNG-CP device to make the response.

In an embodiment, the server lease used by the vBNG-UP device to respond to the DHCP ack packet of the CPE is the proxy lease. The proxy lease is a lease that is defined by the vBNG-CP device and in which the CPE uses a dynamic protocol IP address. The proxy lease and the server lease are independent of each other. The server lease is a lease that is defined by a DHCP server and in which the CPE uses the dynamic protocol IP address. Optionally, the proxy lease is less than the server lease. Because the proxy lease and the server lease are independent of each other, the proxy lease and the server lease may be defined separately, so that a renewed lease of the CPE can be flexibly controlled.

In an embodiment of this application, when ½ and ⅞ of the server lease defined by the DHCP server are used, the vBNG-UP device actively sends a lease renewal request (namely, a DHCP req packet) to the vBNG-CP device through a CPRi to renew the lease, and then the vBNG-CP device sends the lease renewal request to the DHCP server for lease renewal. After receiving a DHCP ack packet returned by the DHCP server, the vBNG-CP device sends the lease renewal response packet, namely, the DHCP ack packet, to the vBNG-UP device through the CPRi. The vBNG-UP device updates the stored proxy lease based on the lease renewal response packet returned by the DHCP server, and responds to a subsequent lease renewal request from the CPE by using an updated server lease.

In an embodiment, the vBNG-UP device responds to the subsequent lease renewal request from the CPE based on a lease renewal response result of the DHCP server. For example, if the lease renewal response result of the DHCP server is a lease renewal failure, after the server lease expires, the vBNG-UP device replies with the lease renewal failure when returning the lease renewal result to the CPE, and disconnects the user.

As shown in FIG. 11, a part below the dotted line shows a go-offline processing process performed when the user is online. When the CPE no longer needs to use the IP address, the CPE sends a go-offline request (namely, a DHCP rel packet) to the vBNG-UP device to disconnect the user. After receiving the DHCP rel packet, the vBNG-UP device sends the DHCP rel packet to the vBNG-CP device through the CPRi, and the vBNG-CP device sends the DHCP rel packet to the DHCP server. After receiving a DHCP ack packet replied by the DHCP server, the vBNG-CP device sends the go-offline response packet (namely, DHCP ack) to the vBNG-UP device through the CPRi. The vBNG-UP device then returns the DHCP ack packet to the CPE to disconnect the user.

In an embodiment, refer to ② in FIG. 11. After the vBNG-CP device receives the go-offline response packet, the vBNG-CP device sends a user entry deletion request to the vBNG-UP device through an SCi, and the vBNG-UP device responds to the user entry deletion request with a user entry deletion response, performs go-offline processing on the user, and deletes user entries of the CPE in the vBNG-CP device and the vBNG-UP device.

It can be learned from the foregoing process that, when the link between the vBNG-CP device and the vBNG-UP device is normal, in the online management process after the CPE accesses the network through the vBNG system, the vBNG-UP device can respond to the lease renewal request packet of the DHCP user based on the stored proxy lease, and periodically and actively request the vBNG-CP device to renew the lease.

Figure 12:
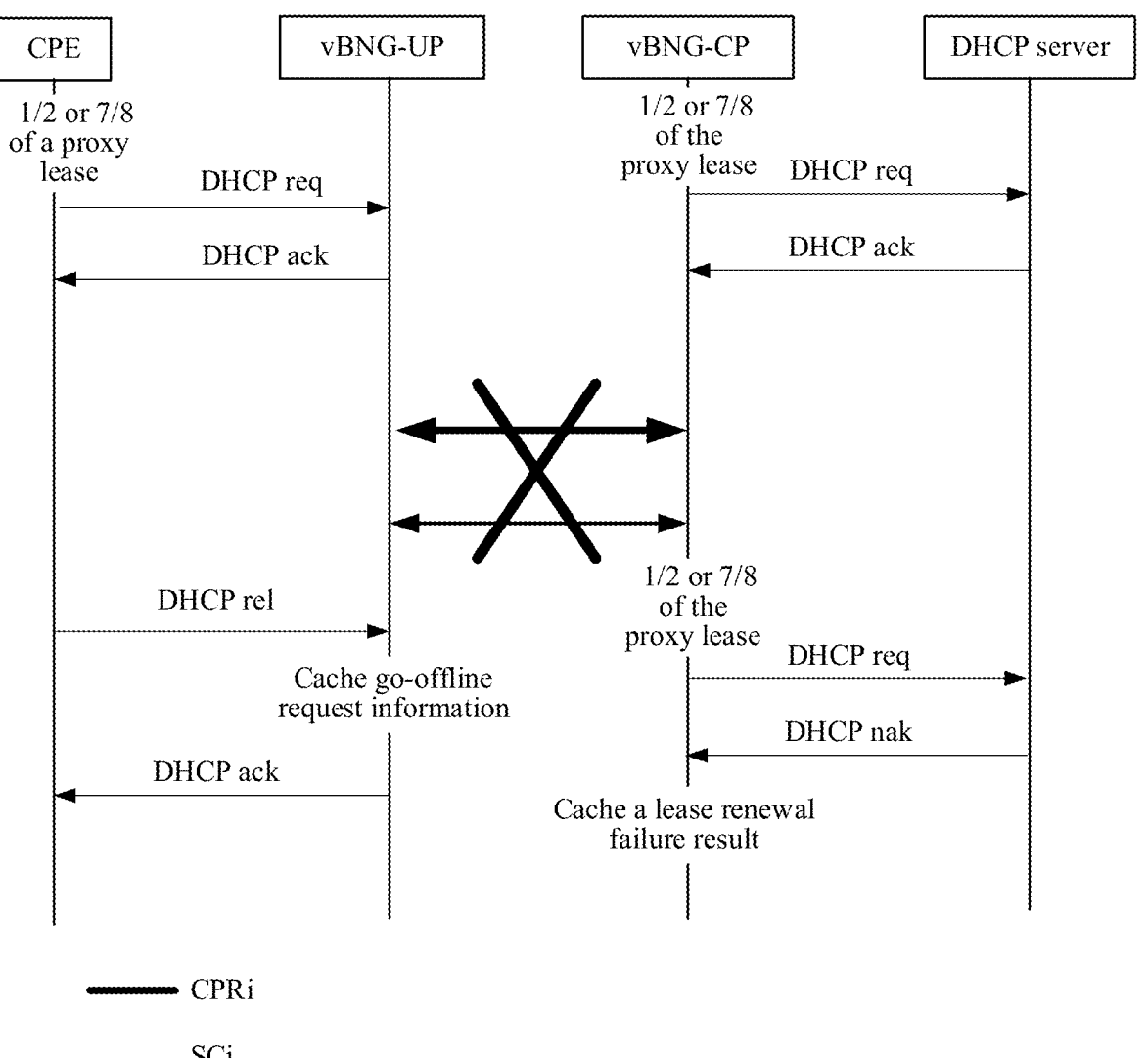
FIG. 12 is a schematic diagram of interaction in another packet processing method according to an embodiment of this application.

Scenario 4: Scenario in which the fault occurs on the link between the vBNG-CP device and the vBNG-UP device after the DHCP user goes online through the vBNG system In the scenario 4, an example in which CPE is the terminal device of the DHCP user is used. When the fault occurs on the link between the vBNG-CP device and the vBNG-UP device, for example, a fault occurs on a CPRi and an SCi between the vBNG-CP device and the vBNG-UP device, for an online management process after the CPE accesses the network through the vBNG system, refer to FIG. 12. FIG. 12 is a schematic diagram of interaction in a packet processing method according to an embodiment of this application.

In an embodiment, as shown in FIG. 12, when the fault occurs on the CPRi and the SCi between the vBNG-CP device and the vBNG-UP device, there are the following several types of processing processes performed by the vBNG-CP device and the vBNG-UP device for different cases.

Case 1: When the vBNG-UP device receives a lease renewal request (namely, a DHCP req packet) sent by the CPE when ½ and ⅞ of a proxy lease expire, the vBNG-UP device continues to respond, based on the proxy lease, to the CPE that lease renewal succeeds, and sends a DHCP ack packet to the CPE, to ensure that the CPE can continue to use the originally assigned dynamic protocol IP address, and IP data traffic of the CPE can be normally forwarded, thereby implementing an offline holding function of the CPE.

Case 2: When receiving a go-offline request (namely, a DHCP rel packet) from the CPE, the vBNG-UP device caches go-offline request information of the user, responds to the user with a go-offline response message, and sends a DHCP ack packet to the CPE. This avoids a case in which the go-offline request sent by the CPE is not responded to, so that the CPE can receive the DHCP ack packet in time and the user can go offline successfully.

Case 3: After perceiving the fault of the CPRi or the SCi, the vBNG-CP device actively sends a lease renewal request (namely, a DHCP req packet) to the DHCP server when ½ and ⅞ of a server lease expire. If the DHCP server responds with a lease renewal success and returns a DHCP ack packet to the vBNG-CP device, the vBNG-CP device updates the server lease of the user. If the DHCP server responds with a lease renewal failure, the vBNG-CP device caches a lease renewal failure result for the user when the server lease expires.

According to the packet processing processes in the foregoing three cases, the DHCP user can implement the offline holding function when the fault occurs on the CPRi and the SCi between the vBNG-CP device and the vBNG-UP device.

Figure 13:
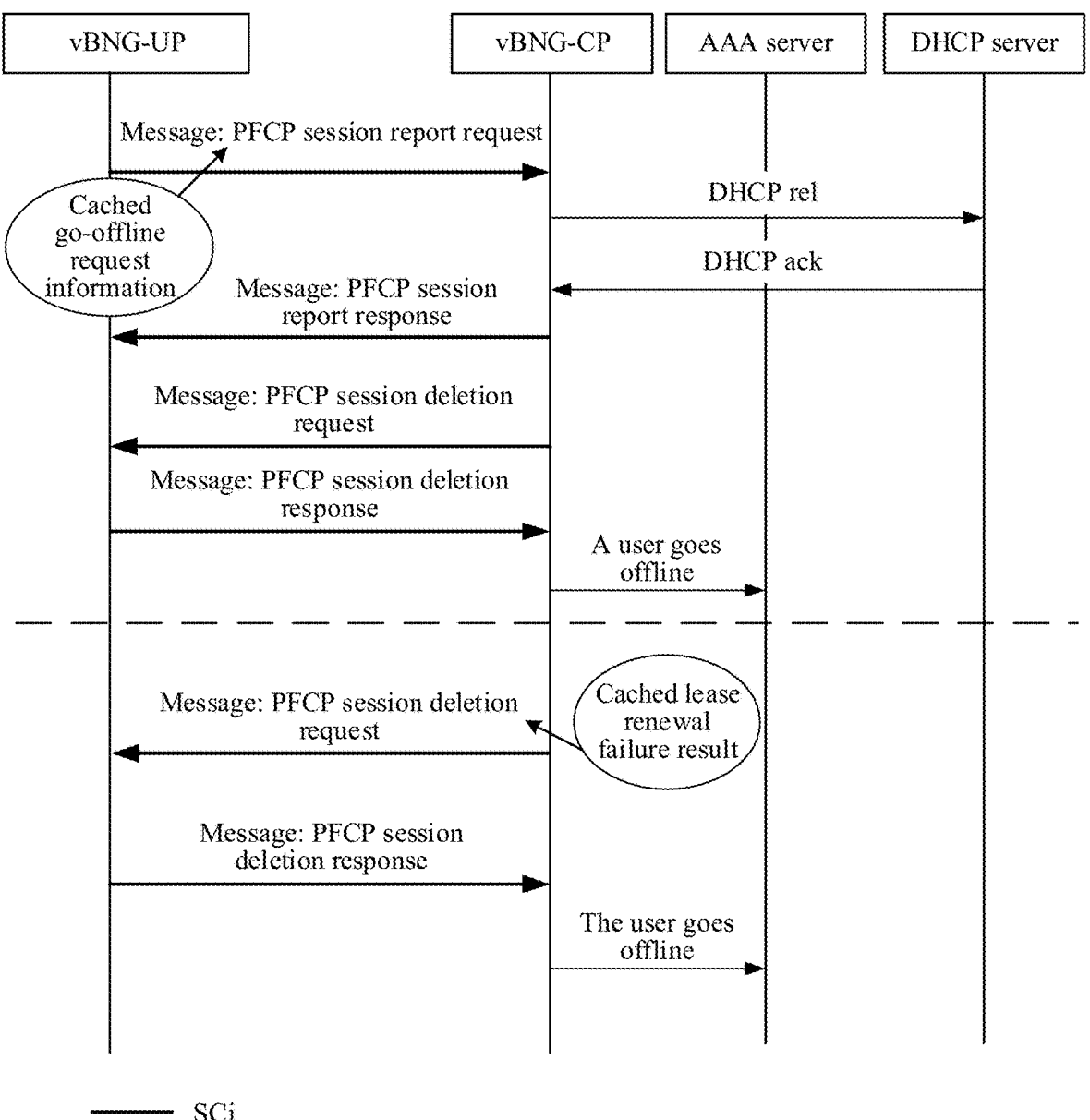
FIG. 13 is a schematic diagram of interaction in another packet processing method according to an embodiment of this application.

Scenario 5: Scenario in which the fault of the link between the vBNG-CP device and the vBNG-UP device is recovered after the DHCP user goes online through the vBNG system In the scenario 5, an example in which CPE is the terminal device of the DHCP user is used. When the fault of the link between the vBNG-CP device and the vBNG-UP device is recovered, for example, a fault of a CPRi and an SCi between the vBNG-CP device and the vBNG-UP device is recovered, for an online management process after the CPE accesses the network through the vBNG system, refer to FIG. 13. FIG. 13 is a schematic diagram of interaction in a packet processing method according to an embodiment of this application.

In an embodiment, when the fault of the CPRi and the SCi between the vBNG-CP device and the vBNG-UP device is recovered, a process of processing go-offline request information cached by the vBNG-UP device when the fault occurs on the CPRi and the SCi between the BNG-CP device and the vBNG-UP device and a lease renewal failure result cached by the vBNG-CP device when the fault occurs on the CPRi and the SCi between the BNG-CP device and the vBNG-UP device is shown in FIG. 13.

As shown in FIG. 13, a part above a dotted line is the process of processing the go-offline request information cached by the vBNG-UP device. The vBNG-UP device sends a message: PFCP session report request to the vBNG-CP device through the SCi, where the message: PFCP session report request includes the cached go-offline request information. The vBNG-CP device returns a message: PFCP session report response to the vBNG-UP device in response to the message: PFCP session report request, performs go-offline processing on the user, and notifies the vBNG-UP device to delete a user entry of the user.

In an embodiment, that the vBNG-CP device performs go-offline processing on the user includes: The vBNG-CP device actively sends a go-offline request (namely, a DHCP rel packet) to the DHCP server, to request the DHCP server to release a dynamic protocol IP address assigned to the user. The DHCP server returns a DHCP ack packet to the vBNG-CP device in response to the DHCP rel packet, to acknowledge that the user goes offline, and reclaims the dynamic protocol IP address assigned to the user.

In an embodiment, that the vBNG-CP device notifies the vBNG-UP device to delete the user entry of the user includes: After receiving the DHCP ack packet that is returned by the DHCP server and that is for acknowledging that the user goes offline, the vBNG-CP device sends a message: PFCP session deletion request to the vBNG-UP device through the SCi. The vBNG-UP device returns a message: PFCP session deletion response to the vBNG-CP device in response to the message: PFCP session deletion request, and deletes user entry information of the user. After receiving the message: PFCP session deletion response, the vBNG-CP device deletes the user entry information of the user, and sends user go-offline information to the AAA server, to notify the AAA server to stop traffic-based charging on the user.

As shown in FIG. 13, a part below the dotted line is the process of processing the lease renewal failure result cached by the vBNG-CP device. The vBNG-CP device sends a message: PFCP session deletion request to the vBNG-UP device through the SCi, where the message: PFCP session deletion request includes the lease renewal failure result cached by the vBNG-CP device. The vBNG-UP device returns a message: PFCP session deletion response to the vBNG-CP device in response to the message: PFCP session deletion request, and deletes the user entry information of the user. After receiving the message: PFCP session deletion response, the vBNG-CP device deletes the user entry information of the user, and sends a user go-offline message to the AAA server, to notify the AAA server to stop the traffic-based charging on the user.

In an embodiment, a DHCP release type needs to be newly added to a resource usage report of the message:

PFCP session report request sent to the vBNG-CP device, to carry the cached go-offline request information, and notify the vBNG-CP device that go-offline processing needs to be performed. For example, FIG. 14 is a schematic diagram of an IE list carried in the message: PFCP session report request.

As shown in FIG. 14, the IE list includes three IEs. For an IE: report type, an identifier is M, indicating that the IE: report type is mandatory in the message: PFCP session report request; and a condition/comment is a report type, and carries type information of the report. For an IE: old CP F-SEID, an identifier is M, indicating that the IE: old CP F-SEID is mandatory in the message: PFCP session report request; and a condition/comment is a corresponding session endpoint ID (SEID) allocated by the CPF, and carries an identifier of an established session. For an IE: usage report, an identifier is C, indicating that when the report type is the resource usage report, the message: PFCP session report request needs to carry the IE: usage report. A type of the IE: usage report is extension required. An extended IE: usage report may carry a plurality of resource reports displayed in a form of a resource report list.

For example, a result of extending the IE: usage report is shown in FIG. 15, and includes three sub-IEs, namely, a sub-IE: usage reporting rule (URR) ID, where an identifier is M, indicating that the sub-IE: URR ID is mandatory in the IE: usage report, and carries an ID of a usage reporting rule; a sub-IE: UR-SEQN, where an identifier is M, indicating that the sub-IE: UR-SEQN is mandatory in the IE: usage report, and carries a resource report message sequence number; and a sub-IE: usage report trigger (trigger), where an identifier is C. When a resource report trigger cause is included, the IE: usage report needs to carry the sub-IE: usage report trigger to carry the resource report trigger cause.

In an embodiment, the sub-IE: usage report trigger is extended to carry the cached go-offline request as the resource report trigger cause in the IE: usage report. For example, a result of extending the sub-IE: usage report trigger is shown in FIG. 16. Each bit of octets 5, 6, and 7 represents one resource report trigger cause, and the bits are respectively represented as X1 to X22 and a DHCP release (DHCP release, DHCPR). The DHCPR located at a bit 6 of the octet 7 is a newly added trigger cause in embodiments of this application, and indicates the go-offline request information that is sent by the CPE and that is cached by the vBNG-UP device. When a value of the DHCPR is 1, it indicates that the vBNG-UP device has received the DHCP rel packet sent by the CPE. Therefore, reporting of the resource report message is triggered to notify the vBNG-CP device that the go-offline processing needs to be performed on the user, in other words, the user entry needs to be deleted.

According to the packet processing method provided in embodiments of this application, the PFCP message for offloading the DHCP online management onto the UP is defined, to offload processing of the online DHCP user onto the vBNG-UP device, so that when the fault occurs on the link between the vBNG-CP device and the vBNG-UP device, the offline holding function of the DHCP user can be implemented, to ensure normal forwarding of the user data traffic; and when the fault of the link between the vBNG-CP device and the vBNG-UP device is recovered, the normal online processing of the DHCP user can be restored.

The foregoing describes the packet processing method in embodiments of this application. Corresponding to the foregoing method, a packet processing apparatus is further provided in embodiments of this application. FIG. 17 is a schematic diagram of a structure of a packet processing apparatus according to an embodiment of this application. The apparatus is used in a UP device of a virtual broadband network gateway, and the virtual broadband network gateway further includes a CP device. Based on the following multiple modules shown in FIG. 17, the packet processing apparatus shown in FIG. 17 can perform all or a part of operations performed by the UP device. It should be understood that the apparatus may include more additional modules than the shown modules or omit a part of the shown modules. This is not limited in this embodiment of this application. As shown in FIG. 17, the apparatus includes:

a protocol module 1701, configured to receive a first packet sent by the CP device, where the first packet carries first indication information, and the first indication information indicates the UP device to perform online management on a terminal device that accesses a network through the virtual broadband access gateway; and a proxy module 1702, configured to: determine a proxy lease of a first terminal device based on the first packet, where the first terminal device is the terminal device that accesses the network through the virtual broadband access gateway; and perform online management on the first terminal device based on the first indication information and the proxy lease of the first terminal device.

In an embodiment, duration of the proxy lease is less than or equal to duration of a server lease, and the server lease indicates duration in which a server allows the first terminal device to access the network.

In an embodiment, the protocol module 1701 is further configured to send a second packet for the first packet to the CP device, where the second packet carries a processing result of the first packet.

In an embodiment, the first packet is a packet forwarding control protocol PFCP packet, and carries the first indication information by using an extended information element IE.

In an embodiment, the proxy module 1702 is configured to: receive a first lease renewal request packet sent by the first terminal device, where the first lease renewal request packet requests to renew the lease of the first terminal device; and return a first lease renewal acknowledgment packet for the first lease renewal request packet to the first terminal device based on the first indication information and the proxy lease of the first terminal device, where the first lease renewal acknowledgment packet indicates whether the lease renewal succeeds.

In an embodiment, the proxy module 1702 is configured to return the first lease renewal acknowledgment packet for the first lease renewal request packet to the first terminal device based on the first indication information and the proxy lease of the first terminal device when a fault occurs on a link between the UP device and the CP device.

In an embodiment, the protocol module 1701 is further configured to: send a second lease renewal request packet for the first terminal device to the CP device based on the server lease of the first terminal device, where the server lease indicates the duration in which the server allows the first terminal device to access the network; and receive a second lease renewal acknowledgment packet returned by the CP device for the second lease renewal request packet, and update the server lease of the first terminal device based on the second lease renewal acknowledgment packet.

In an embodiment, the proxy module 1702 is configured to: receive a go-offline request packet sent by the first terminal device; and return a go-offline acknowledgment packet for the go-offline request packet to the first terminal device based on the first indication information and the proxy lease of the first terminal device when the fault occurs on the link between the UP device and the CP device.

In an embodiment, the proxy module 1702 is configured to cache go-offline request data of the go-offline request packet when the fault occurs on the link between the UP device and the CP device; and the protocol module 1701 is configured to send a go-offline message for the first terminal device to the CP device based on the go-offline request data when the fault of the link between the UP device and the CP device is recovered, where the go-offline message indicates that the first terminal device has gone offline.

In an embodiment, the go-offline message is a PFCP resource report, the PFCP resource report carries a go-offline trigger identifier by using an extended IE, and the go-offline trigger identifier is used by the CP device to perform go-offline processing on the first terminal device.

In an embodiment, the protocol module 1701 is configured to send the go-offline message for the first terminal device to the CP device in response to expiration of the server lease of the first terminal device, where the go-offline message indicates that the first terminal device has gone offline.

In an embodiment, the protocol module 1701 is further configured to receive a user entry of the first terminal device and a go-online acknowledgment packet that are sent by the CP device, where the user entry includes user information of the first terminal device, and the go-online acknowledgment packet includes the server lease of the first terminal device; and the proxy module 1702 is configured to obtain the user information of the first terminal device based on the user entry, and obtain the server lease of the first terminal device based on the go-online acknowledgment packet.

In an embodiment, the proxy module 1702 is configured to determine, based on the first indication information carried in the first packet, that the server lease of the first terminal device is the proxy lease of the first terminal device.

In an embodiment, the first packet further carries a proxy lease of the UP device; and the proxy module 1702 is configured to use the proxy lease of the UP device carried in the first packet as the proxy lease of the first terminal device.

In an embodiment, the proxy module 1702 is further configured to send the proxy lease of the first terminal device to the first terminal device.

In an embodiment, the protocol module 1701 is further configured to: receive a third packet sent by the CP device, where the third packet carries information indicating to remove the first indication information, and the information indicating to remove the first indication information indicates the UP device to remove the online management of the first terminal device; and send a fourth packet for the third packet to the CP device, where the fourth packet carries a processing result of the third packet.

FIG. 18 is a schematic diagram of a structure of a packet processing apparatus according to an embodiment of this application. The apparatus is used in a CP device of a virtual broadband network gateway, and the virtual broadband network gateway further includes a UP device. Based on the following multiple modules shown in FIG. 18, the packet processing apparatus shown in FIG. 18 can perform all or a part of operations performed by the CP device. It should be understood that the apparatus may include more additional modules than the shown modules or omit a part of the shown modules. This is not limited in this embodiment of this application. As shown in FIG. 18, the apparatus includes:

a protocol module 1801, configured to send, by the CP device, a first packet to the UP device, where the first packet carries first indication information, the first indication information indicates the UP device to perform online management on a first terminal device, and the first terminal device is a terminal device that accesses a network through the virtual broadband access gateway.

In an embodiment, the protocol module 1801 is further configured to receive a second packet sent by the UP device for the first packet, where the second packet carries a processing result of the first packet.

In an embodiment, the first packet is a packet forwarding control protocol PFCP packet, and carries the first indication information by using an extended information element IE.

In an embodiment, the first packet further carries a proxy lease of the UP device, duration of the proxy lease is less than or equal to duration of a server lease, and the server lease indicates duration in which a server allows the first terminal device to access the network.

In an embodiment, the apparatus further includes:

a management module 1802, configured to: send a third lease renewal request packet to the server based on the server lease of the first terminal device when a fault occurs on a link between the CP device and the UP device, where the third lease renewal request packet requests to renew the lease of the first terminal device; receive a third lease renewal acknowledgment packet returned by the server for the third lease renewal request packet, where the third lease renewal acknowledgment packet indicates whether the lease renewal succeeds; cache lease renewal failure data in response to an indication of a lease renewal failure by the third lease renewal acknowledgment packet; and perform go-offline processing on the first terminal device based on the lease renewal failure data when the fault of the link between the CP device and the UP device is recovered.

In an embodiment, the management module 1802 is configured to: receive a second lease renewal request packet for the first terminal device sent by the UP device, send the second lease renewal request packet to the server, and receive a second lease renewal acknowledgment packet returned by the server for the second lease renewal request packet; and return the second lease renewal acknowledgment packet to the UP device, where the second lease renewal acknowledgment packet is used by the UP device to update the server lease of the first terminal device.

In an embodiment, the management module 1802 is further configured to: receive a go-offline message sent by the UP device, where the go-offline message indicates that the first terminal device has gone offline; and perform go-offline processing on the first terminal device based on the go-offline message.

In an embodiment, the go-offline message is a PFCP resource report, the PFCP resource report carries a go-offline trigger identifier by using an extended IE, and the go-offline trigger identifier is used by the CP device to perform go-offline processing on the first terminal device.

In an embodiment, the protocol module 1801 is further configured to: send a third packet to the UP device, where the third packet carries information indicating to remove the first indication information, and the information indicating to remove the first indication information indicates the UP device to remove the online management of the first terminal device; and receive a fourth packet sent by the UP device for the third packet, where the fourth packet carries a processing result of the third packet.

It should be understood that, when the apparatuses provided in FIG. 17 and FIG. 18 implement functions of the apparatuses, division into the foregoing functional modules is merely used as an example for description. During actual application, the foregoing functions may be allocated to different functional modules for implementation based on a requirement. In other words, an internal structure of a device is divided into different functional modules, to implement all or a part of the functions described above. In addition, the apparatuses provided in the foregoing embodiments and the method embodiments pertain to the same concept. For specific implementation processes of the apparatuses, refer to the method embodiments. Details are not described herein again.

Figure 19:
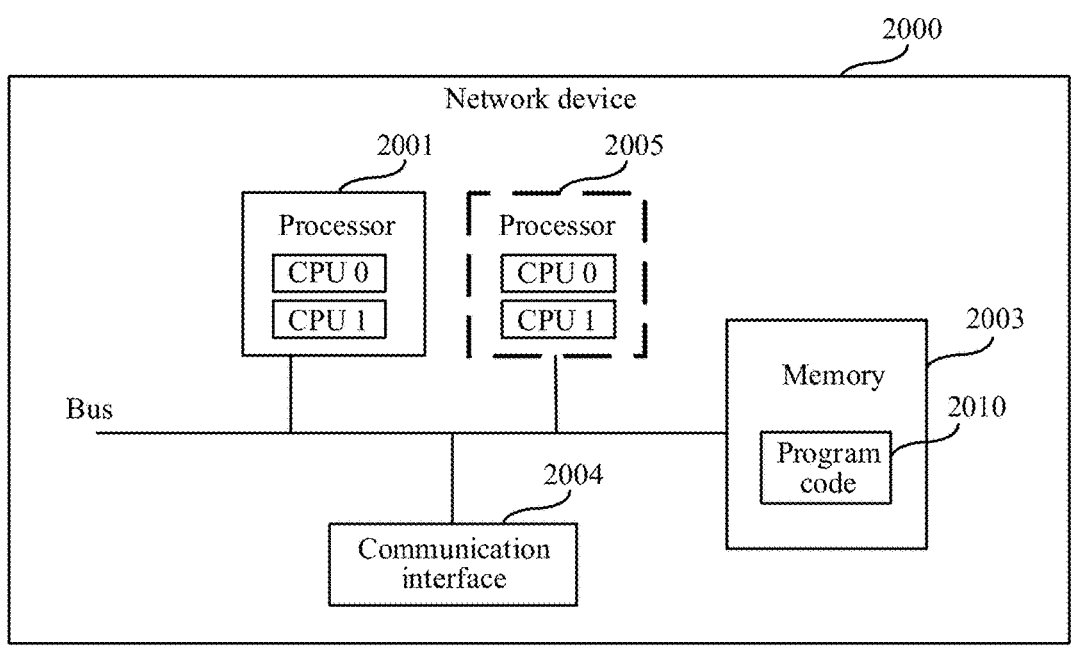
FIG. 19 is a schematic diagram of a structure of a network device according to an embodiment of this application.

FIG. 19 is a schematic diagram of a structure of a network device 2000 according to an example embodiment of this application. The network device 2000 shown in FIG. 19 is configured to perform operations in the packet processing methods shown in FIG. 2 to FIG. 4 and FIG. 10 to FIG. 13. The network device 2000 is, for example, a switch or a router, and may be implemented by using a general bus architecture.

As shown in FIG. 19, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of the present application. Alternatively, the processor may be a combination of processors implementing a computing function, for example, a combination of one or more microprocessors, or a combination of a DSP and a microprocessor.

Optionally, the network device 2000 further includes a bus. The bus is configured to transmit information between the components of the network device 2000. The bus may be a peripheral component interconnect (PCI for short) bus, an extended industry standard architecture (EISA for short) bus, or the like. Buses may be classified into an address bus, a data bus, a control bus, and the like. For ease of representation, only one bold line is used to represent the bus in FIG. 19, but this does not mean that there is only one bus or only one type of bus.

The memory 2003 is, for example, a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or data structure and that can be accessed by a computer, but is not limited thereto. For example, the memory 2003 exists independently, and is connected to the processor 2001 through the bus. Alternatively, the memory 2003 may be integrated with the processor 2001.

The communication interface 2004 is configured to communicate with another device or a communication network by using any transceiver-type apparatus. The communication network may be the Ethernet, a radio access network (RAN), a wireless local area network (WLAN), or the like. The communication interface 2004 may include a wired communication interface, and may further include a wireless communication interface. Specifically, the communication interface 2004 may be an Ethernet interface, a fast ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

During specific implementation, in an embodiment, the processor 2001 may include one or more CPUs, for example, a CPU 0 and a CPU 1 shown in FIG. 19. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the network device 2000 may include a plurality of processors, for example, the processor 2001 and a processor 2005 shown in FIG. 19. Each of the processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the network device 2000 may further include an output device and an input device. The output device communicates with the processor 2001, and may display information in a plurality of manners. For example, the output device may be a liquid crystal display (LCD), a light-emitting diode ( ) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for performing the solutions of this application, and the processor 2001 may execute the program code 2010 stored in the memory 2003. In other words, the network device 2000 may implement, by using the processor 2001 and the program code 2010 in the memory 2003, the packet processing method provided in the method embodiments. The program code 2010 may include one or more software modules. Optionally, the processor 2001 may alternatively store program code or instructions for performing the solutions of this application.

In a specific embodiment, the network device 2000 in this embodiment of this application may correspond to the UP device in the foregoing method embodiments. The processor 2001 in the network device 2000 reads instructions in the memory 2003, so that the network device 2000 shown in FIG. 19 can perform all or a part of operations performed by the UP device.

Specifically, the processor 2001 is configured to: determine a proxy lease of a first terminal device based on a first packet, where the first terminal device is a terminal device that accesses a network through a virtual broadband access gateway; and perform online management on the first terminal device based on first indication information and the proxy lease of the first terminal device.

For brevity, other optional implementations are not described herein again.

For another example, the network device 2000 in this embodiment of this application may correspond to the CP device in the foregoing method embodiments. The processor 2001 in the network device 2000 reads instructions in the memory 2003, so that the network device 2000 shown in FIG. 19 can perform all or a part of operations performed by the CP device.

Specifically, the processor 2001 is configured to send a first packet to a UP device, where the first packet carries first indication information, the first indication information indicates the UP device to perform online management on a first terminal device, and the first terminal device is a terminal device that accesses a network through a virtual broadband access gateway.

For brevity, other optional implementations are not described herein again.

The network device 2000 may alternatively correspond to the packet processing apparatuses shown in FIG. 17 and FIG. 18, and each functional module in the packet processing apparatus is implemented by using software of the network device 2000. In other words, the functional modules included in the packet processing apparatus are generated by the processor 2001 of the network device 2000 by reading the program code 2010 stored in the memory 2003.

The operations of the packet processing methods shown in FIG. 2 to FIG. 4 and FIG. 10 to FIG. 13 are completed by using an integrated logic circuit of hardware in the processor of the network device 2000 or instructions in a software form. The operations of the methods disclosed with reference to embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and performs the operations in the foregoing methods in combination with the hardware in the processor. To avoid repetition, details are not described herein again.

Figure 20:
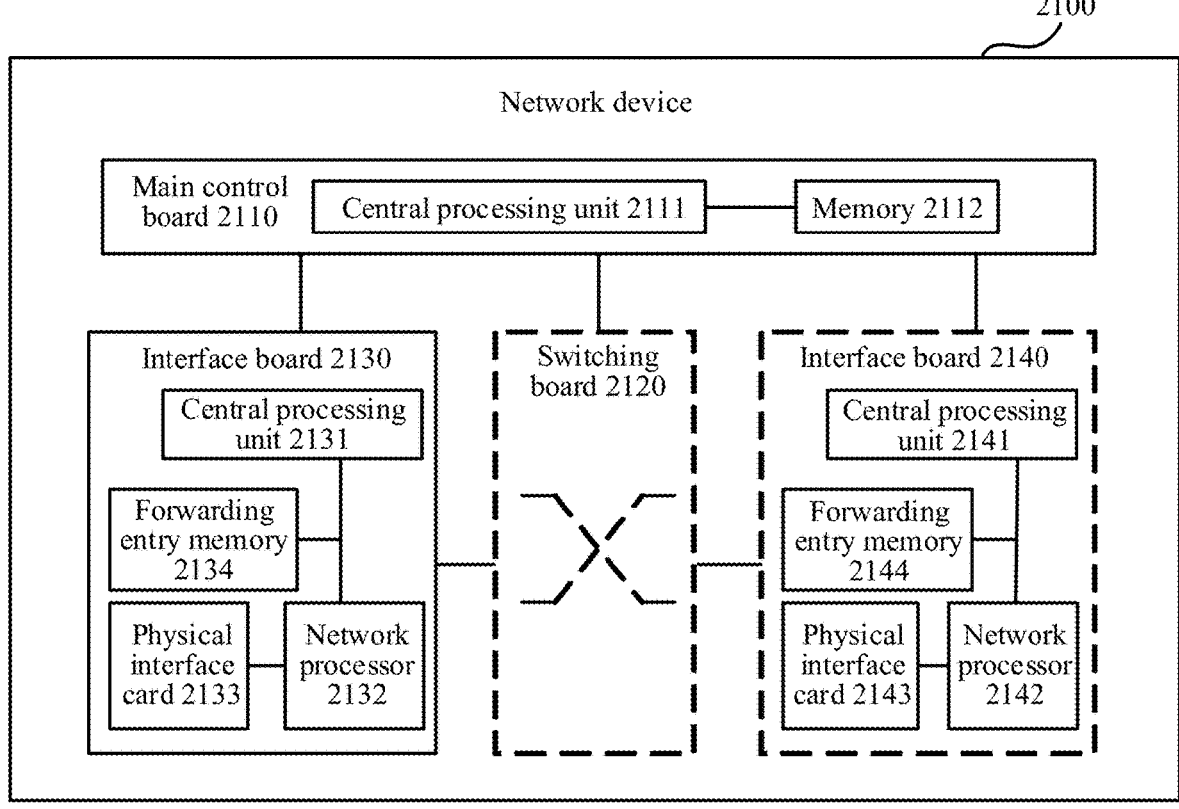
FIG. 20 is a schematic diagram of a structure of another network device according to an embodiment of this application.

FIG. 20 is a schematic diagram of a structure of a network device 2100 according to another example embodiment of this application. The network device 2100 shown in FIG. 20 is configured to perform all or a part of operations in the packet processing methods shown in FIG. 2 to FIG. 4 and FIG. 10 to FIG. 13. The network device 2100 is, for example, a switch or a router, and may be implemented by using a general bus architecture.

As shown in FIG. 20, the network device 2100 includes a main control board 2110 and an interface board 2130.

The main control board is also referred to as a main processing unit (MPU) or a route processor card. The main control board 2110 is configured to perform control and management on components in the network device 2100, where the control and management include route computation, device management, device maintenance, and a protocol processing function. The main control board 2110 includes: a central processing unit 2111 and a memory 2112.

The interface board 2130 is also referred to as a line processing unit (LPU), a line card, or a service board. The interface board 2130 is configured to provide various service interfaces, and forward a data packet. The service interface includes, but is not limited to, an Ethernet interface, a POS (Packet over SONET/SDH) interface, and the like. The Ethernet interface is, for example, a flexible Ethernet service interface (Flexible Ethernet Clients, FlexE Clients). The interface board 2130 includes a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2132 is configured to forward a received packet based on a forwarding table stored in the forwarding entry memory 2134. If a destination address of the packet is an address of the network device 2100, the network processor 2132 sends the packet to a CPU (for example, the central processing unit 2131) for processing. If a destination address of the packet is not an address of the network device 2100, the network processor 2132 finds, in the forwarding table based on the destination address, a next hop and an outbound interface that correspond to the destination address, and forwards the packet to the outbound interface corresponding to the destination address. Processing on an uplink packet may include: processing at a packet ingress interface and forwarding table lookup, and processing on a downlink packet may include: forwarding table lookup and the like. In some embodiments, the central processing unit may alternatively perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a sub-card, may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on the general-purpose CPU, so that the physical interface card 2133 does not need the network processor 2132.

Optionally, the network device 2100 includes a plurality of interface boards. For example, the network device 2100 further includes an interface board 2140, and the interface board 2140 includes: a central processing unit 2141, a network processor 2142, a forwarding entry memory 2144, and a physical interface card 2143. Functions and implementations of the components in the interface board 2140 are the same as or similar to those of the interface board 2130, and details are not described herein again.

Optionally, the network device 2100 further includes a switching board 2120. The switching board 2120 may also be referred to as a switch fabric unit (SFU). When the network device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard through a system bus for interworking. In an embodiment, an inter-process communication (IPC) channel is established between the main control board 2110 and each of the interface board 2130 and the interface board 2140, and communication between the main control board 2110 and each of the interface board 2130 and the interface board 2140 is performed through the IPC channel.

Logically, the network device 2100 includes a control plane and a forwarding plane. The control plane includes the main control board 2110 and the central processing unit 2111. The forwarding plane includes components for forwarding, for example, the forwarding entry memory 2134, the physical interface card 2133, and the network processor 2132. The control plane performs the following functions: a function of a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a central forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a network device in the central architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained by combining the two central processing units. This form of network device (for example, a low-end switch or a router) has a weak data exchange and processing capability. A specific architecture that is to be used depends on a specific networking deployment scenario. This is not limited herein.

In a specific embodiment, the network device 2100 corresponds to the packet processing apparatus shown in FIG. 17 that is used in the UP device. In some embodiments, the protocol module 1701 in the packet processing apparatus shown in FIG. 17 is equivalent to the physical interface card 2133 in the network device 2100, and the proxy module 1702 is equivalent to the central processing unit 2111 or the network processor 2132 in the network device 2100.

In some embodiments, the network device 2100 further corresponds to the packet processing apparatus shown in FIG. 18 that is used in the CP device. In some embodiments, the protocol module 1801 in the packet processing apparatus shown in FIG. 18 is equivalent to the physical interface card 2133 in the network device 2100.

Based on the network devices shown in FIG. 19 and FIG. 20, an embodiment of this application further provides a packet processing system. The processing system includes a UP device and a CP device. Optionally, the UP device is the network device 2000 shown in FIG. 19 or the network device 2100 shown in FIG. 20, and the CP device is the network device 2000 shown in FIG. 19 or the network device 2100 shown in FIG. 20.

For a packet processing method performed by the UP device and the CP device, refer to related descriptions in the embodiments shown in FIG. 2 to FIG. 4 and FIG. 10 to FIG. 13, and details are not described herein again.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the method that needs to be performed by the UP device.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the method that needs to be performed by the CP device.

It should be understood that the foregoing processor may be a CPU, or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a nonvolatile random access memory. For example, the memory may further store information about a device type.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this application further provides a computer-readable storage medium. The storage medium stores at least one instruction, and the instruction is loaded and executed by a processor, to enable a computer to implement any one of the foregoing packet processing methods.

An embodiment of this application further provides a computer program (product). When the computer program is executed by a computer, a processor or the computer may perform corresponding operations and/or procedures in the foregoing method embodiments.

An embodiment of this application further provides a chip, including a processor, configured to invoke instructions from a memory and run the instructions stored in the memory, so that a communication device on which the chip is installed performs any one of the foregoing packet processing methods.

An embodiment of this application further provides another chip, including an input interface, an output interface, a processor, and a memory. The input interface, the output interface, the processor, and the memory are connected to each other through an internal connection path. The processor is configured to execute code in the memory. When the code is executed, the processor is configured to perform any one of the foregoing packet processing methods.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedures or functions according to this application are all or partially generated. The computer may be a general-purpose computer, a special-purpose computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may be aware that, the method operations and the modules described with reference to embodiments disclosed in this specification can be implemented by using software, hardware, firmware, or any combination thereof. To clearly describe interchangeability between the hardware and the software, the operations and composition of each embodiment have been generally described above based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person of ordinary skill in the art may understand that all or some of the operations of embodiments may be implemented by hardware or a program instructing related hardware. The program may be stored in a computer-readable storage medium. The storage medium may be a read-only memory, a magnetic disk, or an optical disc.

When software is used to implement embodiments, all or some of embodiments may be implemented in a form of a computer program product. The computer program product includes one or more computer program instructions. For example, the method in embodiments of this application may be described in context of machine-executable instructions. The machine-executable instructions are included in, for example, a program module executed in a device on a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program modules. The machine-executable instructions for the program module may be executed locally or in a distributed device. In the distributed device, the program module may be located in both a local storage medium and a remote storage medium.

Computer program code for implementing the method in embodiments of this application may be written in one or more programming languages. The computer program code may be provided for a processor of a general-purpose computer, a special-purpose computer, or another programmable data processing apparatus, so that when the program code is executed by the computer or the another programmable data processing apparatus, functions/operations specified in the flowcharts and/or block diagrams are implemented. The program code may be completely executed on a computer, partially executed on a computer, executed as an independent software package, partially executed on a computer and partially executed on a remote computer, or completely executed on a remote computer or server.

In context of embodiments of this application, the computer program code or related data may be carried by any appropriate carrier, so that a device, an apparatus, or a processor can perform various processing and operations described above. For example, the carrier includes a signal, a computer-readable medium, and the like.

For example, the signal may include propagating signals in electrical, optical, radio, sound, or other forms, such as carriers and infrared signals.

The machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any appropriate combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

It may be clearly understood by a person skilled in the art that, for convenient and brief description, for a detailed working process of the foregoing system, device, and module, refer to a corresponding process in the foregoing method embodiments. Details are not described herein again.

In the several embodiments provided in this application, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be omitted or not performed. In addition, the displayed or discussed mutual couplings or direct couplings or communication connections may be implemented through some interfaces, and the indirect couplings or communication connections between the devices or modules may be electrical connections, mechanical connections, or connections in other forms.

The modules described as separate parts may or may not be physically separate, and parts displayed as modules may or may not be physical modules, to be specific, may be located in one position, or may be distributed on a plurality of network modules. Some or all of the modules may be selected based on an actual requirement to achieve the objectives of the solutions in embodiments of this application.

In addition, the functional modules in embodiments of this application may be integrated into one processing module, each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, the part contributing to the conventional technology, or all or some of the technical solutions may be implemented in a form of a software product. The computer software product is stored in a storage medium and includes several instructions to cause a computer device (which may be a personal computer, a server, a network device, or the like) to perform all or some of the operations of the method in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms "first", "second", and the like are used to distinguish between same or similar items whose effects and functions are basically the same. It should be understood that there is no logical or time-sequence dependency among "first", "second", and "n$^{th}$", and a quantity and an execution sequence are not limited. It should also be understood that although the terms such as "first" and "second" are used in the following descriptions to describe various elements, these elements should not be limited by the terms. These terms are merely used to distinguish one element from another element. For example, without departing from a range of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in listed items that are associated. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that the term "include" (or "includes", "including", "comprises", and/or "comprising"), when being used in this specification, specifies the presence of stated features, integers, operations, operations, elements, and/or components, but does not preclude the presence or addition of one or more other features, integers, operations, operations, elements, components, and/or groups thereof.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that determining B based on A does not mean that B is determined only based on A, but B may be determined based on A and/or other information.

It should be further understood that "one embodiment", "an embodiment", or "a possible implementation" mentioned throughout this specification means that particular features, structures, or characteristics related to embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

The foregoing descriptions are merely optional embodiments of this application, but are not intended to limit this application. Any modification, equivalent replacement, improvement, or the like made without departing from the spirit and principle of this application shall fall within the protection scope of this application.

What is claimed is:

1. A network device, comprising:
   one or more processors; and
   one or more memories configured to store instructions, which when executed by the one or more processors, cause the network device to:
   receive a first packet sent by a control plane (CP) device of a virtual broadband network gateway that further includes a user plane (UP) device, wherein the first packet carries first indication information that instructs the UP device to perform online management on a terminal device that accesses a network through the virtual broadband network gateway;
   determine a proxy lease of a first terminal device based on the first packet, wherein the first terminal device accesses the network through the virtual broadband network gateway; and
   perform online management on the first terminal device based on the first indication information and the proxy lease of the first terminal device;
   wherein a duration of the proxy lease is less than or equal to a duration of a server lease that indicates a duration in which a server allows the first terminal device to access the network.

2. The network device according to claim 1, wherein the duration of the proxy lease is less than the duration of the server lease that indicates the duration in which the server allows the first terminal device to access the network.

3. The network device according to claim 1, wherein the first packet is a packet forwarding control protocol (PFCP) packet, and carries the first indication information by use of an extended information element (IE).

4. The network device according to claim 1, wherein executing the instructions further causes the network device to:
   receive a first lease renewal request packet sent by the first terminal device, wherein the first lease renewal request packet requests to renew a lease of the first terminal device; and return a first lease renewal acknowledgment packet in response to the first lease renewal request packet to the first terminal device based on the first indication information and the proxy lease of the first terminal device, wherein the first lease renewal acknowledgment packet indicates whether the lease renewal succeeds.

5. The network device according to claim 4, wherein executing the instructions further causes the network device to:
   return the first lease renewal acknowledgment packet for the first lease renewal request packet to the first terminal device based on the first indication information and the proxy lease of the first terminal device when a fault occurs on a link between the UP device and the CP device.

6. The network device according to claim 1, wherein executing the instructions further causes the network device to:
   send a second lease renewal request packet for the first terminal device to the CP device based on a server lease of the first terminal device, wherein the server lease indicates a duration in which a server allows the first terminal device to access the network;
   receive a second lease renewal acknowledgment packet returned by the CP device in response to the second lease renewal request packet; and
   update the server lease of the first terminal device based on the second lease renewal acknowledgment packet.

7. The network device according to claim 1, wherein executing the instructions further causes the network device to:
   receive a go-offline request packet sent by the first terminal device; and
   return a go-offline acknowledgment packet in response to the go-offline request packet to the first terminal device based on the first indication information and the proxy lease of the first terminal device when a fault occurs on a link between the UP device and the CP device.

8. The network device according to claim 7, wherein executing the instructions further causes the network device to:
   cache go-offline request data of the go-offline request packet when the fault occurs on the link between the UP device and the CP device; and
   send a go-offline message for the first terminal device to the CP device based on the go-offline request data when the fault of the link between the UP device and the CP device is recovered, wherein the go-offline message indicates that the first terminal device has gone offline.

9. The network device according to claim 1, wherein executing the instructions further causes the network device to:
   send a go-offline message for the first terminal device to the CP device in response to expiration of a server lease of the first terminal device, wherein the go-offline message indicates that the first terminal device has gone offline.

10. The network device according to claim 1, wherein executing the instructions further causes the network device to:
   determine, based on the first indication information carried in the first packet, that a server lease of the first terminal device is the proxy lease of the first terminal device.

11. The network device according to claim 1, wherein the first packet further carries a proxy lease of the UP device; and executing the instructions further causes the network device to:

use the proxy lease of the UP device carried in the first packet as the proxy lease of the first terminal device.

12. The network device according to claim 1, wherein executing the instructions further causes the network device to:

send the proxy lease of the first terminal device to the first terminal device.

13. The network device according to claim 1, wherein executing the instructions further causes the network device to:

receive a third packet sent by the CP device, wherein the third packet carries information indicating to remove the first indication information, and the information indicating to remove the first indication information indicates the UP device to remove the online management of the first terminal device; and send a fourth packet in response to the third packet to the CP device, wherein the fourth packet carries a processing result of the third packet.

14. A virtual broadband network gateway system, comprising:

a user plane (UP) device; and a control plane (CP) device configured to:

send a first packet to the UP device, wherein the first packet carries first indication information that instructs the UP device to perform online management on a first terminal device, and the first terminal device accesses a network through the virtual broadband network gateway system;

wherein the UP device is configured to:

receive the first packet sent by the CP device;

determine a proxy lease of a first terminal device based on the first packet; and perform online management on the first terminal device based on the first indication information and the proxy lease of the first terminal device;

wherein a duration of the proxy lease is less than or equal to a duration of a server lease that indicates a duration in which a server allows the first terminal device to access the network.

15. The virtual broadband network gateway system according to claim 14, wherein the duration of the proxy lease is less than the duration of the server lease that indicates the duration in which the server allows the first terminal device to access the network.

16. The virtual broadband network gateway system according to claim 14, wherein the first packet is a packet forwarding control protocol (PFCP) packet, and carries the first indication information by use of an extended information element (IE).

17. The virtual broadband network gateway system according to claim 14, wherein the UP device is further configured to:

receive a first lease renewal request packet sent by the first terminal device, wherein the first lease renewal request packet requests to renew a lease of the first terminal device; and return a first lease renewal acknowledgment packet in response to the first lease renewal request packet to the first terminal device based on the first indication information and the proxy lease of the first terminal device, wherein the first lease renewal acknowledgment packet indicates whether the lease renewal succeeds.

18. The virtual broadband network gateway system according to claim 17, wherein the UP device is further configured to:

return the first lease renewal acknowledgment packet in response to the first lease renewal request packet to the first terminal device based on the first indication information and the proxy lease of the first terminal device when a fault occurs on a link between the UP device and the CP device.

19. The virtual broadband network gateway system according to claim 14, wherein the UP device is further configured to:

send a second lease renewal request packet in response to the first terminal device to the CP device based on a server lease of the first terminal device, wherein the server lease indicates a duration in which a server allows the first terminal device to access the network;

receive a second lease renewal acknowledgment packet returned by the CP device in response to the second lease renewal request packet; and update the server lease of the first terminal device based on the second lease renewal acknowledgment packet.

* * * * *